US010635383B2

(12) United States Patent
Mäkinen et al.

(10) Patent No.: US 10,635,383 B2
(45) Date of Patent: Apr. 28, 2020

(54) VISUAL AUDIO PROCESSING APPARATUS

(71) Applicant: Nokia Technologies Oy, Espoo (FI)

(72) Inventors: Toni Henrik Mäkinen, Pirkkala (FI); Mikko Tammi, Tampere (FI); Miikka Tapani Vilermo, Siuro (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/781,182

(22) PCT Filed: Apr. 4, 2013

(86) PCT No.: PCT/IB2013/052690
§ 371 (c)(1),
(2) Date: Sep. 29, 2015

(87) PCT Pub. No.: WO2014/162171
PCT Pub. Date: Oct. 9, 2014

(65) Prior Publication Data
US 2016/0299738 A1    Oct. 13, 2016

(51) Int. Cl.
*H03G 5/00* (2006.01)
*G06F 3/16* (2006.01)
(Continued)

(52) U.S. Cl.
CPC ............ *G06F 3/165* (2013.01); *G06F 3/0416* (2013.01); *G06F 3/0488* (2013.01); *G06F 3/162* (2013.01);
(Continued)

(58) Field of Classification Search
CPC ...... G06F 3/165; G06F 3/0416; G06F 3/0488; G06F 3/162; G06F 3/167; H04S 3/0002;
(Continued)

(56) References Cited

U.S. PATENT DOCUMENTS 5,661,808 A     8/1997   Klayman
6,490,359 B1 *  12/2002  Gibson ................ G10H 1/0008
                                             381/119

(Continued)

FOREIGN PATENT DOCUMENTS

EP     2 154 910 A1    2/2010
EP     2 346 028 A1    7/2011
(Continued)

OTHER PUBLICATIONS

International Search Report and Written Opinion received for corresponding Patent Cooperation Treaty Application No. PCT/IB2013/052690, dated Mar. 19, 2014, 15 pages.
(Continued)

*Primary Examiner* — Vivian C Chin
*Assistant Examiner* — Ammar T Hamid
(74) *Attorney, Agent, or Firm* — Alston & Bird LLP

(57) ABSTRACT

An apparatus comprising: an image element determiner configured to determine at least one visual image element; a spatial audio analyser configured to determine, using at least two audio signals, at least one audio source with a location associated with the at least one visual image element; a user interface controller configured to provide at least one control input associated with the at least one visual element, and an audio processor configured to process the at least one audio source to change at least one audio characteristic of the at least one audio source based on the at least one control input.

20 Claims, 31 Drawing Sheets

(51) Int. Cl.

| | | |
|---|---|---|
| *H04S 7/00* | (2006.01) | |
| *G06F 3/041* | (2006.01) | |
| *G06F 3/0488* | (2013.01) | |
| *H04S 3/00* | (2006.01) | |
| *H04R 1/40* | (2006.01) | |

(52) U.S. Cl.
CPC ............... *H04S 3/002* (2013.01); *H04S 7/30* (2013.01); *H04R 2499/11* (2013.01); *H04S 2400/01* (2013.01); *H04S 2420/01* (2013.01); *H04S 2420/07* (2013.01)

(58) Field of Classification Search
CPC ........ H04S 7/30; H04S 5/005; H04S 2400/01; H04S 2400/15; H04S 2420/01; H04S 2420/07; H04R 2227/003; H04R 2420/09; H04R 2499/11
USPC .............................................. 381/98, 119, 97
See application file for complete search history.

(56) References Cited

U.S. PATENT DOCUMENTS

| | | |
|---|---|---|
| 7,706,543 B2 | 4/2010 | Daniel |
| 8,023,660 B2 | 9/2011 | Faller |
| 8,280,077 B2 | 10/2012 | Avendano et al. |
| 8,335,321 B2 | 12/2012 | Daishin et al. |
| RE44,611 E | 11/2013 | Metcalf |
| 8,600,530 B2 | 12/2013 | Nagle et al. |
| 8,861,739 B2 | 10/2014 | Ojanpera |
| 9,015,051 B2 | 4/2015 | Pulkki |
| 9,456,289 B2 | 9/2016 | Tammi et al. |
| 9,794,686 B2 | 10/2017 | Tammi et al. |
| 10,154,361 B2 | 12/2018 | Tammi et al. |
| 2003/0161479 A1 | 8/2003 | Yang et al. |
| 2005/0008170 A1 | 1/2005 | Pfaffinger et al. |
| 2005/0028140 A1 | 2/2005 | Ayachitula et al. |
| 2005/0195990 A1 | 9/2005 | Kondo et al. |
| 2005/0244023 A1 | 11/2005 | Roeck et al. |
| 2008/0013751 A1 | 1/2008 | Hiselius |
| 2008/0232601 A1 | 9/2008 | Pulkki |
| 2008/0298597 A1 | 12/2008 | Turku et al. |
| 2009/0012779 A1 | 1/2009 | Ikeda et al. |
| 2009/0022328 A1 | 1/2009 | Neugebauer et al. |
| 2009/0116652 A1 | 5/2009 | Kirkeby et al. |
| 2010/0061558 A1 | 3/2010 | Faller |
| 2010/0123785 A1* | 5/2010 | Chen ................. H04N 5/23219 348/207.11 |
| 2010/0123789 A1* | 5/2010 | Yang ..................... G02B 7/102 348/222.1 |
| 2010/0150364 A1 | 6/2010 | Buck et al. |
| 2010/0166191 A1 | 7/2010 | Herre et al. |
| 2010/0215199 A1 | 8/2010 | Breebaart |
| 2010/0245624 A1 | 9/2010 | Beaucoup |
| 2010/0272297 A1 | 10/2010 | Boretzki |
| 2010/0284551 A1 | 11/2010 | Oh et al. |
| 2010/0290629 A1 | 11/2010 | Morii |
| 2011/0038485 A1 | 2/2011 | Neoran |
| 2011/0081024 A1 | 4/2011 | Soulodre |
| 2011/0129095 A1 | 6/2011 | Avendano et al. |
| 2011/0299702 A1 | 12/2011 | Faller |
| 2012/0013768 A1 | 1/2012 | Zurek et al. |
| 2012/0019689 A1 | 1/2012 | Zurek et al. |
| 2012/0182429 A1* | 7/2012 | Forutanpour .......... H04R 3/005 348/175 |
| 2012/0317594 A1* | 12/2012 | Thorn .................... H04N 5/607 725/18 |
| 2013/0238335 A1* | 9/2013 | Hyun ................. G10L 21/0208 704/248 |
| 2014/0198918 A1* | 7/2014 | Li ............................ H04S 7/30 381/26 |

FOREIGN PATENT DOCUMENTS

| | | |
|---|---|---|
| GB | 394325 A | 6/1933 |
| JP | 2006-180039 A | 7/2006 |
| JP | 2009-271183 A | 11/2009 |
| WO | WO 1999/60788 A1 | 11/1999 |
| WO | WO 2005/086139 A1 | 9/2005 |
| WO | WO 2007/011157 A1 | 1/2007 |
| WO | WO 2008/046531 A1 | 4/2008 |
| WO | WO 2009/150288 A1 | 12/2009 |
| WO | WO 2010/017833 A1 | 2/2010 |
| WO | WO 2010/028784 A1 | 3/2010 |
| WO | WO 2010/125228 A1 | 11/2010 |
| WO | WO 2011/076286 A1 | 6/2011 |
| WO | WO 2013/093565 A1 | 6/2013 |

OTHER PUBLICATIONS

Schultz_Amling et al., "Acoustical Zooming Based on a Parametric Sound Field Representation", AES Convention, May 2010, 9 pages.
Aarts, Ronald M. and Irwan, Roy, "A Method to Convert Stereo to Multi-Channel Sound", Audio Engineering Society Conference Paper, Presented at the 19th International Conference Jun. 21-24, 2001; Schloss Elmau, Germany.
Advisory Action for U.S. Appl. No. 13/209,738 dated Aug. 20, 2014.
Advisory Action from U.S. Appl. No. 12/927,663 dated Dec. 12, 2014.
Advisory Action from U.S. Appl. No. 12/927,663 dated Jan. 29, 2014.
Ahonen, Jukka, et al., "Directional analysis of sound field with linear microphone array and applications in sound reproduction", AES 124th Convention, Convention Paper 7329, May 2008, 11 pgs.
An Intelligent Microphone Designed for Groups [online]. Retrieved from the Internet: <URL:http://www.dev-audio.com/products/microphone/>. (dated Oct. 15, 2012) 4 pages.
Backman, Juha, "Microphone array beam forming for multichannel recording", AES 114th Convention, Convention Paper 5721, Mar. 2003, 7 pgs.
Baumgarte, Frank, et al., "Binaural Cue Coding—Part I: Psychoacoustic Fundamentals and Design Principles", IEEE 2003, pp. 509-519.
Blumlein, A.D.; U.K. Patent 394,325, 1931. Reprinted in Stereophonic Techniquest (Audio Engineering Society, New York, 1986).
Breebaart et al., "Multi-Channel Goes Mobile: MPEG Surround Binaural Rendering", 29th International Conference: Audio for Mobile and Handheld Devices, Sep. 2-4, 2006, pp. 1-13.
Craven, Peter G.; "Continuous Surround Panning for 5-Speaker Reproduction", Continuous Surround Panning, AES 24th International Conferences on Multichannel Audio Jun. 2003.
Extended European Search Report from corresponding European Patent Application No. 11840946.5 dated Feb. 24, 2015.
Extended European Search Report from corresponding European Patent Application No. 13880977.7 dated Oct. 20, 2016.
Faller, Christof, et al., "Binaural Cue Coding—Part II: Schemes and Applications", IEEE, Nov. 2003, pp. 520-531.
Fielder, Louis et al.; "Introduction to Dolby Digital Plus, an Enhancement to the Dolby Digital Coding System"; Presented at the 117th Convention; Oct. 28-31, 2004; San Francisco, CA; 29 pages.
Gallo, Emmanuel, et al., "Extracting and Re-rendering Structured Auditory Scenes from Field Recordings", AES 30th International Conference, Mar. 2007, 11 pgs.
Gerzon, Michael A., Ambisonics in Multichannel Broadcasting and Video, AES, Oct. 1983, 31 pgs.
Goodwin, Michael M. and Jot, Jean-Marc, "Binaural 3-D Audio Rendering based on Spatial Audio Scene Coding", Audio Engineering Society Convention paper 7277, Presented at the 123rd Convention, Oct. 5-8, 2007, New York, NY.
Herre, Jurgen; "MPEG Surround—The ISO/MPEG Standard for Efficient and Compatible Multichannel Audio Coding"; J. Audio Eng. Soc., vol. 56, No. 11, Nov. 2008; pp. 932-955.
International Search Report and Written Opinion received for corresponding Patent Cooperation Treaty Application No. PCT/FI2011/050861, dated Feb. 24, 2012.

(56) References Cited

OTHER PUBLICATIONS

International Search Report and Written Opinion received for corresponding Patent Cooperation Treaty Application No. PCT/FI2012/050763, dated Feb. 4, 2013.
ISO/IEC 23003-1; International Standard; Information Technology—MPEG Audio Technologies—Part 1: MPEG Surround Sound; ISO/IEC 2007; 13 pages.
Kallinger, Markus, et al., "Enhanced Direction Estimation Using Microphone Arrays For Directional Audio Coding", IEEE, 2008, pp. 45-48.
Kassier, Rafael et al.; "An Informal Comparison Between Surround-Sound Microphone Techniques"; Audio Engineering Society; Presented at the 118th Convention; May 28-31, 2005; Barcelona, Spain; 17 pages.
Knapp, "The Generalized Correlation Method for Estimation of Time Delay", (Aug. 1976), (pp. 320-327).
Laitinen, Mikko-Ville, et al., "Binaural Reproduction for Directional Audio Coding", IEEE, Oct. 2009, pp. 337-340.
Lindblom, Jonas et al., "Flexible Sum-Difference Stereo Coding Based on Time-Aligned Signal Components", IEEE, Oct. 2005, pp. 255-258.
Merimaa, Juha, "Applications of a 3-D Microphone Array", AES 112th Convention, Convention Paper 5501, May 2002, 1 1_pgs.
Meyer, Jens, et al., "Spherical microphone array for spatial sound recording", AES 115th Convention, Convention Paper 5975, Oct. 2003, 9 pgs.
Nakadai, Kazuhiro, et al., "Sound Source Tracking with Directivity Pattern Estimation Using a 64 ch Microphone Array", 7 pgs. 2005.
Notice of Allowance for U.S. Appl. No. 13/209,738 dated Nov. 20, 2015.
Notice of Allowance for U.S. Appl. No. 13/209,738 dated Nov. 5, 2015.
Notice of Allowance from U.S. Appl. No. 12/927,663 dated Apr. 19, 2016.
Notice of Allowance from U.S. Appl. No. 12/927,663 dated Jul. 13, 2016.
Notice of Allowance from U.S. Appl. No. 12/927,663 dated Jun. 5, 2015.
Notice of Allowance from U.S. Appl. No. 12/927,663 dated Jun. 9, 2016.
Notice of Allowance from U.S. Appl. No. 12/927,663 dated Oct. 1, 2015.
Office Action for U.S. Appl. No. 13/209,738 dated Apr. 1, 2014.
Office Action for U.S. Appl. No. 13/209,738 dated Jul. 16, 2015.
Office Action for U.S. Appl. No. 13/209,738 dated Nov. 24, 2014.
Office Action for U.S. Appl. No. 13/209,738 dated Oct. 7, 2013.
Office Action from European Patent Application No. 11840946.5 dated Mar. 3, 2016.
Office Action from European Patent Application No. 11840946.5 dated Nov. 17, 2016.
Office Action from European Patent Application No. 11840946.5 dated Oct. 22, 2014.
Office Action from U.S. Appl. No. 12/927,663 dated Apr. 1, 2015.
Office Action from U.S. Appl. No. 12/927,663 dated Mar. 27, 2014.
Office Action from U.S. Appl. No. 12/927,663 dated May 3, 2013.
Office Action from U.S. Appl. No. 12/927,663 dated Nov. 20, 2013.
Office Action from U.S. Appl. No. 12/927,663 dated Oct. 23, 2014.
Pulkki et al., "Directional Audio Coding—Perception-Based Reproduction of Spatial Sound", International Workshop on the Principles and Applications of Spatial Hearing, Nov. 11-13, 2009, 4 pages.
Pulkki, V.; "Virtual Sound Source Positioning Using Vector Base Amplitude Panning," J. Audio Eng. Soc., vol. 45, pp. 456466 (Jun. 1997).
Pulkki, Ville, "Spatial Sound Reproduction with Directional Audio Coding", J. Audio Eng. Soc., vol. 55 No. 6, Jun. 2007, pp. 503-516.
Tamai, Yuki et al., "Real-Time 2 Dimensional Sound Source Localization by 128-Channel Hugh Microphone Array", IEEE, 2004, pp. 65-70.
Tammi et al., Apparatus and Method for Multi-Channel Signal Playback, U.S. Appl. No. 13/209,738, filed Aug. 15, 2011.
Tammi et al., Converting Multi-Microphone Captured Signals to Shifted Signals Useful for Binaural Signal Processing and Use Thereof, U.S. Appl. No. 12/927,663, filed Nov. 19, 2010.
Tellakula; "Acoustic Source Localization Using Time Delay Estimation"; Thesis; Aug. 2007; whole document (82 pages).
Wiggins, Bruce, "An Investigation Into the Real-Time Manipulation and Control of Three-Dimensional Sound Fields", University of Derby, 2004, 348 pgs.
Office Action from European Patent Application No. 11840946.5 dated Aug. 18, 2017, 5 pages.
Office Action for European Application No. 13880977.7 dated Dec. 6, 2018, 9 pages.
Office Action for U.S. Appl. No. 14/851,266 dated Sep. 21, 2017.
Office Action for U.S. Appl. No. 14/851,266 dated Sep. 20, 2018.
Office Action for U.S. Appl. No. 14/851,266 dated Apr. 19, 2019.
Office Action for U.S. Appl. No. 14/851,266 dated Mar. 16, 2018.

* cited by examiner

Figure 28a

Directly convert multichannel synthesis output to stereo/mono
e.g. L(z) = FL(z) + 0.71C(z) + 0.71 RL(z)
R(z) = FL(z) + 0.71C(z) + 0.71 RR(z)
2701

Figure 28b

Perform stereo synthesis from mid signals m(b) based on angle α(b) combined with side signals S(b)
2703

Figure 28c

Perform stereo panning based on angle estimations α(b)
2705

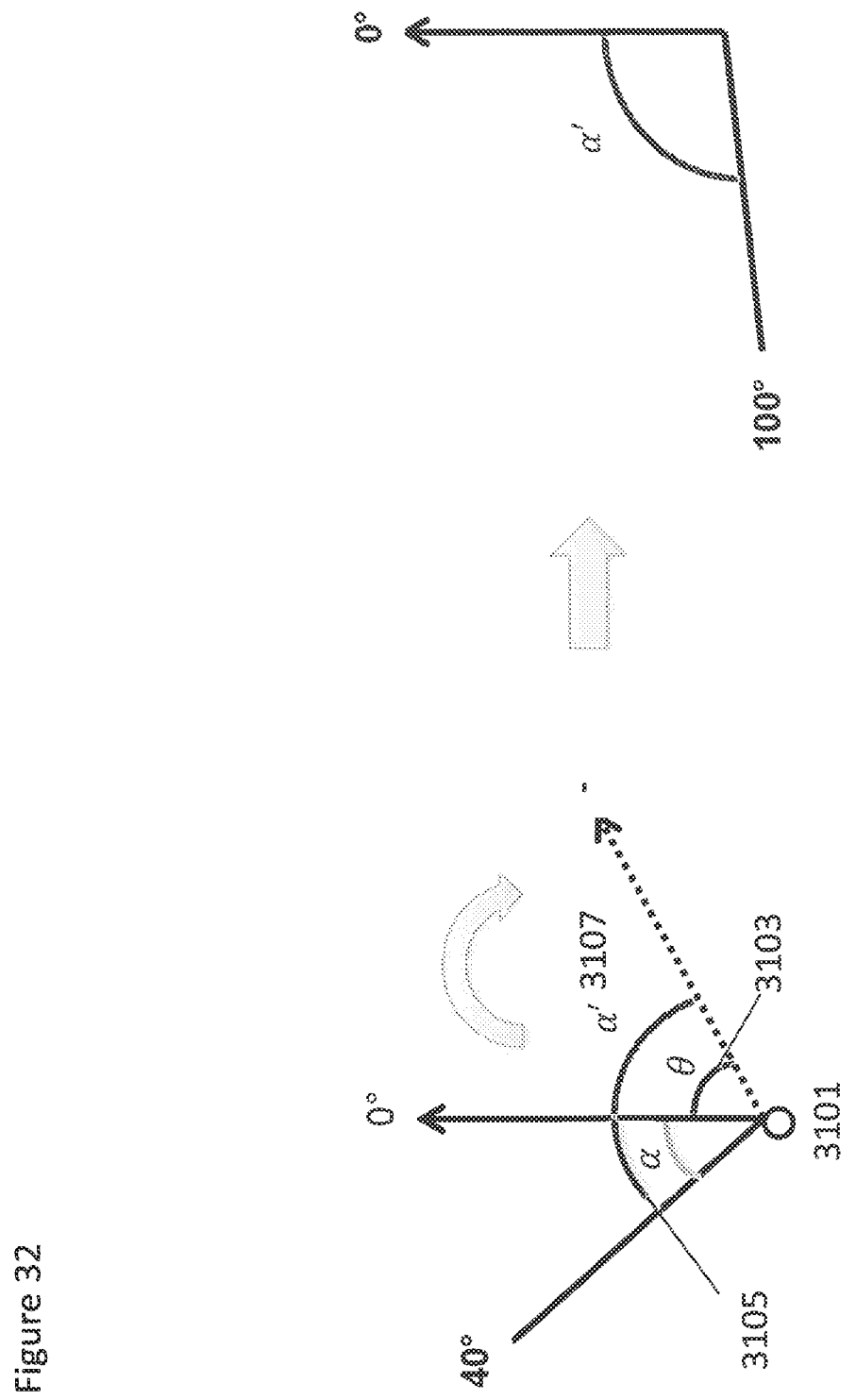

VISUAL AUDIO PROCESSING APPARATUS

RELATED APPLICATION

This application was originally filed as Patent Cooperation Treaty Application No. PCT/IB2013/052690 filed Apr. 4, 2013.

FIELD

The present application relates to apparatus for audio processing. The application further relates to, but is not limited to, portable or mobile apparatus for audio processing.

BACKGROUND

Audio and audio-video recording on electronic apparatus is now common. Devices ranging from professional video capture equipment, consumer grade camcorders and digital cameras to mobile phones and even simple devices as webcams can be used for electronic acquisition of motion video images. Recording video and the audio associated with video has become a standard feature on many mobile devices and the technical quality of such equipment has rapidly improved. Recording personal experiences using a mobile device is quickly becoming an increasingly important use for mobile devices such as mobile phones and other user equipment. Combining this with the emergence of social media and new ways to efficiently share content underlies the importance of these developments and the new opportunities offered for the electronic device industry.

In such devices, multiple microphones can be used to capture efficiently audio events. However it is difficult to convert the captured signals into a form such that the listener can experience the events as originally recorded. For example it is difficult to reproduce the audio event in a compact coded form as a spatial representation. Therefore often it is not possible to fully sense the directions of the sound sources or the ambience around the listener in a manner similar to the sound environment as recorded.

Multichannel playback systems such as commonly used 5.1 channel reproduction can be used for presenting spatial signals with sound sources in different directions. In other words they can be used to represent the spatial events captured with a multi-microphone system. These multi-microphone or spatial audio capture systems can convert multi-microphone generated audio signals to multi-channel spatial signals.

Similarly spatial sound can be represented with binaural signals. In the reproduction of binaural signals, headphones or headsets are used to output the binaural signals to produce a spatially real audio environment for the listener.

SUMMARY OF THE APPLICATION

Aspects of this application thus provide a audio processing capability to enable more flexible audio processing.

There is provided an apparatus comprising at least one processor and at least one memory including computer code for one or more programs, the at least one memory and the computer code configured to with the at least one processor cause the apparatus to at least perform: determine at least one visual image element; determine, using at least two audio signals, at least one audio source with a location associated with the at least one visual image element; provide at least one control input associated with the at least one visual element, and process the at least one audio source to change at least one audio characteristic of the at least one audio source based on the at least one control input.

The apparatus may be further caused to: generate the at least one visual image element comprising at least one user interface overlay element and at least one captured image frame; and display the at least one visual image element on a touch interface display configured to provide the at least one control input.

Providing the at least one control input may cause the apparatus to determine at least one user interface parameter associated with the at least one control input.

Generating the at least one visual image element may cause the apparatus to generate the at least one user interface overlay element based on the at least one user interface parameter.

The at least one user interface overlay may comprise at least one of: an overlay displaying the at least one audio source signal with a location; a focus region overlay displaying a processing focus range and direction; a zoom location overlay displaying a processing zoom or motion location; a rotation overlay displaying a processing rotation; a toggle activate spatial processing overlay configured to display the toggle state for generating at least one further at least one user interface overlay element; a focus amplification overlay configured to display at least one amplification gain for audio sources inside a focus region; a focus attenuation overlay configured to display at least one attenuation dampening for audio sources outside of a focus region; a focus inverter overlay configured to display a toggle state for inverting the focus operation; and a focus amplification profile overlay configured to display an amplification profile for directions surrounding the apparatus.

Providing at least one control input associated with the at least one visual element may cause the apparatus to provide at least one of: at least one control input generated by a motion of the apparatus displaying the at least one visual image element; and at least one control input generated by an operation of camera inputs associated with the at least one visual image element.

The at least one audio source to change at least one audio characteristic of the at least one audio source based on the at least one control input may cause the apparatus to: generate at least one processing parameter associated with the at least one control input; and process the at least one audio source based on the at least one processing parameter.

Generating at least one processing parameter associated with the at least one control input may cause the apparatus to generate at least one of: at least one focus region range; at least one focus region direction; at least one smoothing region direction; at least one smoothing region range; at least one focus region amplification gain; at least one focus region out of region attenuation factor; at least one focus region attenuation factor; at least one focus region out of region amplification gain; at least one virtual motion or zoom direction; at least one virtual motion or zoom displacement; and at least one virtual motion or rotation angle of rotation.

Processing the at least one audio source based on the at least one processing parameter may cause the apparatus to perform at least one of: determine a zoom location based on the at least one virtual motion or zoom direction and at least one virtual motion or zoom displacement; determine for the at least one audio source a new distance between the zoom location and the at least one audio source location; determine for the at least one audio source a new direction between the zoom location and the at least one audio source location; replace the at least one audio source location with a new audio source location based on the new distance and new direction values.

Processing the at least one audio source based on the at least one processing parameter may cause the apparatus to perform: determine a rotation orientation based on the at least one virtual motion or rotation angle; determine for the at least one audio source a new direction between the rotation orientation and the at least one audio source location; and replace the at least one audio source location with a new audio source location based on the new direction value.

Processing the at least one audio source based on the at least one processing parameter may cause the apparatus to perform at least one of: amplify the at least one audio source by the at least one focus region amplification gain where the at least one audio source location is within the at least one focus region direction and range; attenuate the at least one audio source by the at least one focus region out of region attenuation factor where the at least one audio source location is outside the at least one focus region direction and range and outside the at least one smoothing region direction and range; and apply an interpolation of the at least one focus region amplification gain and the at least one focus region out of region attenuation factor where the at least one audio source location is within the at least one smoothing region direction and range.

Processing the at least one audio source based on the at least one processing parameter may cause the apparatus to perform at least one of: attenuate the at least one audio source by the at least one focus region attenuation factor where the at least one audio source location is within the at least one focus region direction and range; amplify the at least one audio source by the at least one focus region out of region amplification gain where the at least one audio source location is outside the at least one focus region direction and range and outside the at least one smoothing region direction and range; and apply an interpolation of the at least one focus region attenuation factor and the at least one focus region out of region amplification gain where the at least one audio source location is within the at least one smoothing region direction and range.

Processing the at least one audio source based on the at least one processing parameter may cause the apparatus to perform applying a time smoothing factor to at least one of: the at least one focus region amplification gain; at least one focus region out of region attenuation factor; at least one focus region attenuation factor; and at least one focus region out of region amplification gain.

The apparatus may be further caused to receive the at least two audio signals from at least one of: at least two microphones; an apparatus memory; and at least one further apparatus.

The apparatus may be further caused to: receive at least one captured image frame from which the at least one visual image element is determined, wherein the at least one captured image frame is received from at least one of: at least one camera; a memory; and at least one further apparatus.

According to a second aspect there is provided a method comprising: determining at least one visual image element; determining, using at least two audio signals, at least one audio source with a location associated with the at least one visual image element; providing at least one control input associated with the at least one visual element, and processing the at least one audio source to change at least one audio characteristic of the at least one audio source based on the at least one control input.

The method may further comprise: generating the at least one visual image element comprising at least one user interface overlay element and at least one captured image frame; and displaying the at least one visual image element on a touch interface display configured to provide the at least one control input.

Providing the at least one control input may comprise determining at least one user interface parameter associated with the at least one control input.

Generating the at least one visual image element may comprise generating the at least one user interface overlay element based on the at least one user interface parameter.

The at least one user interface overlay may comprise at least one of: an overlay displaying the at least one audio source signal with a location; a focus region overlay displaying a processing focus range and direction; a zoom location overlay displaying a processing zoom or motion location; a rotation overlay displaying a processing rotation; a toggle activate spatial processing overlay configured to display the toggle state for generating at least one further at least one user Interface overlay element; a focus amplification overlay configured to display at least one amplification gain for audio sources inside a focus region; a focus attenuation overlay configured to display at least one attenuation dampening for audio sources outside of a focus region; a focus inverter overlay configured to display a toggle state for inverting the focus operation; and a focus amplification profile overlay configured to display an amplification profile for directions surrounding the apparatus.

Providing at least one control input associated with the at least one visual element may comprise at least one of: at least one control input generated by a motion of the apparatus displaying the at least one visual image element; at least one control input generated by an operation of camera inputs associated with the at least one visual image element.

The at least one audio source to change at least one audio characteristic of the at least one audio source based on the at least one control input may comprise: generating at least one processing parameter associated with the at least one control input; and processing the at least one audio source based on the at least one processing parameter.

Generating at least one processing parameter associated with the at least one control input may comprise generating at least one of: at least one focus region range; at least one focus region direction; at least one smoothing region direction; at least one smoothing region range; at least one focus region amplification gain; at least one focus region out of region attenuation factor; at least one focus region attenuation factor; at least one focus region out of region amplification gain; at least one virtual motion or zoom direction; at least one virtual motion or zoom displacement; and at least one virtual motion or rotation angle of rotation.

Processing the at least one audio source based on the at least one processing parameter may comprise at least one of: determining a zoom location based on the at least one virtual motion or zoom direction and at least one virtual motion or zoom displacement; determining for the at least one audio source a new distance between the zoom location and the at least one audio source location; determining for the at least one audio source a new direction between the zoom location and the at least one audio source location; and replacing the at least one audio source location with a new audio source location based on the new distance and new direction values.

Processing the at least one audio source based on the at least one processing parameter may comprise at least one of: determining a rotation orientation based on the at least one virtual motion or rotation angle; determining for the at least one audio source a new direction between the rotation orientation and the at least one audio source location; replacing the at least one audio source location with a new audio source location based on the new direction value.

Processing the at least one audio source based on the at least one processing parameter comprises at least one of: amplifying the at least one audio source by the at least one focus region amplification gain where the at least one audio source location is within the at least one focus region direction and range; attenuating the at least one audio source by the at least one focus region out of region attenuation factor where the at least one audio source location is outside the at least one focus region direction and range and outside the at least one smoothing region direction and range; and applying an interpolation of the at least one focus region amplification gain and the at least one focus region out of region attenuation factor where the at least one audio source location is within the at least one smoothing region direction and range.

Processing the at least one audio source based on the at least one processing parameter may comprise at least one of: attenuating the at least one audio source by the at least one focus region attenuation factor where the at least one audio source location is within the at least one focus region direction and range; amplifying the at least one audio source by the at least one focus region out of region amplification gain where the at least one audio source location is outside the at least one focus region direction and range and outside the at least one smoothing region direction and range; and applying an interpolation of the at least one focus region attenuation factor and the at least one focus region out of region amplification gain where the at least one audio source location is within the at least one smoothing region direction and range.

Processing the at least one audio source based on the at least one processing parameter may comprise applying a time smoothing factor to at least one of: the at least one focus region amplification gain; at least one focus region out of region attenuation factor; at least one focus region attenuation factor; and at least one focus region out of region amplification gain.

The method may comprise receiving the at least two audio signals from at least one of: at least two microphones; an apparatus memory; and at least one further apparatus.

The method may comprise: receiving at least one captured image frame from which the at least one visual image element is determined, wherein the at least one captured image frame is received from at least one of: at least one camera; a memory; and at least one further apparatus.

According to a third aspect there is provided an apparatus comprising: means for determining at least one visual image element; means for determining, using at least two audio signals, at least one audio source with a location associated with the at least one visual image element; means for providing at least one control input associated with the at least one visual element, and means for processing the at least one audio source to change at least one audio characteristic of the at least one audio source based on the at least one control input.

The apparatus may further comprise: means for generating the at least one visual image element comprising at least one user interface overlay element and at least one captured image frame; and means for displaying the at least one visual image element on a touch interface display configured to provide the at least one control input.

The means for providing the at least one control input may comprise means for determining at least one user interface parameter associated with the at least one control input.

The means for generating the at least one visual image element may comprise generating the at least one user interface overlay element based on the at least one user interface parameter.

The at least one user interface overlay may comprise at least one of: an overlay displaying the at least one audio source signal with a location; a focus region overlay displaying a processing focus range and direction; a zoom location overlay displaying a processing zoom or motion location; a rotation overlay displaying a processing rotation; a toggle activate spatial processing overlay configured to display the toggle state for generating at least one further at least one user interface overlay element; a focus amplification overlay configured to display at least one amplification gain for audio sources inside a focus region; a focus attenuation overlay configured to display at least one attenuation dampening for audio sources outside of a focus region; a focus inverter overlay configured to display a toggle state for inverting the focus operation; and a focus amplification profile overlay configured to display an amplification profile for directions surrounding the apparatus.

The means for providing at least one control input associated with the at least one visual element may comprise at least one of: at least one control input generated by a motion of the apparatus displaying the at least one visual image element; at least one control input generated by an operation of camera inputs associated with the at least one visual image element.

The at least one audio source to change at least one audio characteristic of the at least one audio source based on the at least one control input may comprise: means for generating at least one processing parameter associated with the at least one control input; and means for processing the at least one audio source based on the at least one processing parameter.

The means for generating at least one processing parameter associated with the at least one control input may comprise generating at least one of: at least one focus region range; at least one focus region direction; at least one smoothing region direction; at least one smoothing region range; at least one focus region amplification gain; at least one focus region out of region attenuation factor; at least one focus region attenuation factor; at least one focus region out of region amplification gain; at least one virtual motion or zoom direction; at least one virtual motion or zoom displacement; and at least one virtual motion or rotation angle of rotation.

The means for processing the at least one audio source based on the at least one processing parameter may comprise at least one of: means for determining a zoom location based on the at least one virtual motion or zoom direction and at least one virtual motion or zoom displacement; means for determining for the at least one audio source a new distance between the zoom location and the at least one audio source location; means for determining for the at least one audio source a new direction between the zoom location and the at least one audio source location; and means for replacing the at least one audio source location with a new audio source location based on the new distance and new direction values.

The means for processing the at least one audio source based on the at least one processing parameter may comprise at least one of: means for determining a rotation orientation based on the at least one virtual motion or rotation angle; means for determining for the at least one audio source a new direction between the rotation orientation and the at least one audio source location; means for replacing the at least one audio source location with a new audio source location based on the new direction value.

The means for processing the at least one audio source based on the at least one processing parameter comprises at least one of: means for amplifying the at least one audio source by the at least one focus region amplification gain where the at least one audio source location is within the at least one focus region direction and range; means for attenuating the at least one audio source by the at least one focus region out of region attenuation factor where the at least one audio source location is outside the at least one focus region direction and range and outside the at least one smoothing region direction and range; and means for applying an interpolation of the at least one focus region amplification gain and the at least one focus region out of region attenuation factor where the at least one audio source location is within the at least one smoothing region direction and range.

The means for processing the at least one audio source based on the at least one processing parameter may comprise at least one of: means for attenuating the at least one audio source by the at least one focus region attenuation factor where the at least one audio source location is within the at least one focus region direction and range; means for amplifying the at least one audio source by the at least one focus region out of region amplification gain where the at least one audio source location is outside the at least one focus region direction and range and outside the at least one smoothing region direction and range; and means for applying an interpolation of the at least one focus region attenuation factor and the at least one focus region out of region amplification gain where the at least one audio source location is within the at least one smoothing region direction and range.

The means for processing the at least one audio source based on the at least one processing parameter may comprise means for applying a time smoothing factor to at least one of: the at least one focus region amplification gain; at least one focus region out of region attenuation factor; at least one focus region attenuation factor, and at least one focus region out of region amplification gain.

The apparatus may comprise means for receiving the at least two audio signals from at least one of: at least two microphones; an apparatus memory; and at least one further apparatus.

The apparatus may comprise: means for receiving at least one captured image frame from which the at least one visual image element is determined, wherein the at least one captured image frame is received from at least one of: at least one camera; a memory; and at least one further apparatus.

According to a fourth aspect there is provided an apparatus comprising: an image element determiner configured to determine at least one visual image element; a spatial audio analyser configured to determine, using at least two audio signals, at least one audio source with a location associated with the at least one visual image element; a user interface controller configured to provide at least one control input associated with the at least one visual element, and an audio processor configured to process the at least one audio source to change at least one audio characteristic of the at least one audio source based on the at least one control input.

The image element determiner may further be configured to generate the at least one visual image element comprising at least one user interface overlay element and at least one captured image frame; and a display configured to display the at least one visual image element on a touch interface display configured to provide the at least one control input.

The user interface controller may be configured to determine at least one user interface parameter associated with the at least one control input.

The image element determiner may be configured to generate the at least one user interface overlay element based on the at least one user interface parameter.

The at least one user interface overlay element may comprise at least one of: an overlay displaying the at least one audio source signal with a location; a focus region overlay displaying a processing focus range and direction; a zoom location overlay displaying a processing zoom or motion location; a rotation overlay displaying a processing rotation; a toggle activate spatial processing overlay configured to display the toggle state for generating at least one further at least one user interface overlay element; a focus amplification overlay configured to display at least one amplification gain for audio sources inside a focus region; a focus attenuation overlay configured to display at least one attenuation dampening for audio sources outside of a focus region; a focus inverter overlay configured to display a toggle state for inverting the focus operation; and a focus amplification profile overlay configured to display an amplification profile for directions surrounding the apparatus.

The user interface controller may be configured to generate at least one of: at least one control input generated by a motion of the apparatus displaying the at least one visual image element; at least one control input generated by an operation of camera inputs associated with the at least one visual image element.

The audio processor may be configured to: generate at least one processing parameter associated with the at least one control input; and process the at least one audio source based on the at least one processing parameter.

The audio processor configured to generate at least one processing parameter associated with the at least one control input may be configured to generate at least one of: at least one focus region range; at least one focus region direction; at least one smoothing region direction; at least one smoothing region range; at least one focus region amplification gain; at least one focus region out of region attenuation factor; at least one focus region attenuation factor; at least one focus region out of region amplification gain; at least one virtual motion or zoom direction; at least one virtual motion or zoom displacement; and at least one virtual motion or rotation angle of rotation.

The audio processor configured to process the at least one audio source based on the at least one processing parameter may be configured to: determine a zoom location based on the at least one virtual motion or zoom direction and at least one virtual motion or zoom displacement; determine for the at least one audio source a new distance between the zoom location and the at least one audio source location; determine for the at least one audio source a new direction between the zoom location and the at least one audio source location; and replace the at least one audio source location with a new audio source location based on the new distance and new direction values.

The audio processor configured to process the at least one audio source based on the at least one processing parameter may be configured to: determine a rotation orientation based on the at least one virtual motion or rotation angle; determine for the at least one audio source a new direction between the rotation orientation and the at least one audio source location; replace the at least one audio source location with a new audio source location based on the new direction value.

The audio processor configured to process the at least one audio source based on the at least one processing parameter may be configured to: amplify the at least one audio source by the at least one focus region amplification gain where the at least one audio source location is within the at least one focus region direction and range; attenuate the at least one audio source by the at least one focus region out of region attenuation factor where the at least one audio source location is outside the at least one focus region direction and range and outside the at least one smoothing region direction and range; and apply an interpolation of the at least one focus region amplification gain and the at least one focus region out of region attenuation factor where the at least one audio source location is within the at least one smoothing region direction and range.

The audio processor configured to process the at least one audio source based on the at least one processing parameter may be configured to: attenuate the at least one audio source by the at least one focus region attenuation factor where the at least one audio source location is within the at least one focus region direction and range; amplify the at least one audio source by the at least one focus region out of region amplification gain where the at least one audio source location is outside the at least one focus region direction and range and outside the at least one smoothing region direction and range; and apply an interpolation of the at least one focus region attenuation factor and the at least one focus region out of region amplification gain where the at least one audio source location is within the at least one smoothing region direction and range.

The audio processor configured to process the at least one audio source based on the at least one processing parameter may be configured to apply a time smoothing factor to at least one of: the at least one focus region amplification gain; at least one focus region out of region attenuation factor; at least one focus region attenuation factor; and at least one focus region out of region amplification gain.

The apparatus may comprise an input configured to receive the at least two audio signals from at least one of: at least two microphones; an apparatus memory; and at least one further apparatus.

The apparatus may comprise: an input configured to receive at least one captured image frame from which the at least one visual image element is determined, wherein the at least one captured image frame is received from at least one of: at least one camera; a memory; and at least one further apparatus.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which:

FIGS. 28A, 28B, and 28C show flow diagrams showing the operations of performing channel mode conversions according to some embodiments;

FIG. 32 shows schematically an example of spatial audio rotating according to some embodiments.

EMBODIMENTS OF THE APPLICATION

Figure 1:
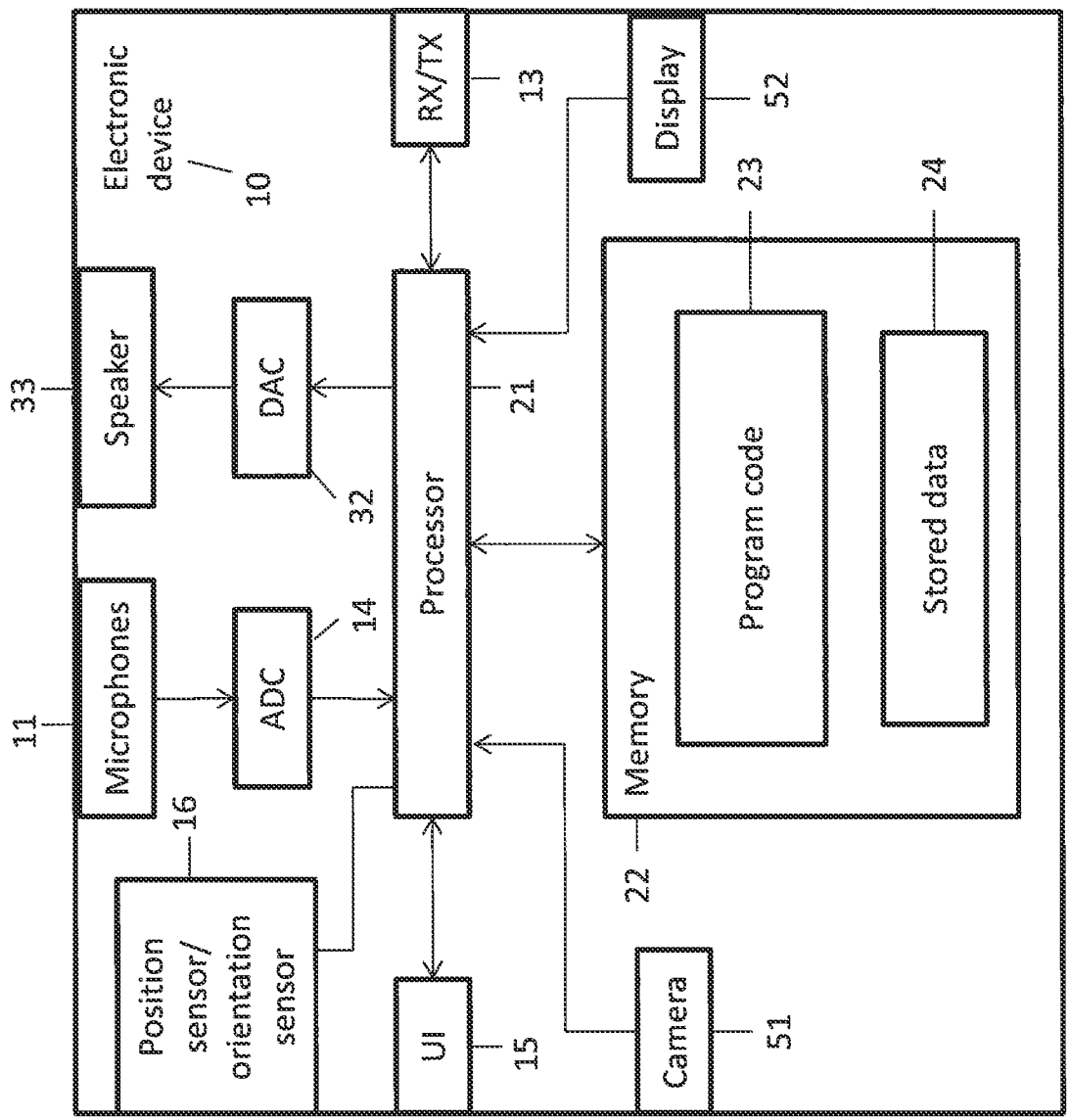
FIG. 1 shows a schematic view of an apparatus suitable for implementing embodiments.

The following describes in further detail suitable apparatus and possible mechanisms for the provision of effective audio processing.

As described herein audio events can be captured efficiently by using multiple microphones in an array. However, it is often difficult to convert captured signals into a form that can be experienced from any viewpoint easily. There can particularly be lacking from the experience the 'experience' of spatial representation. In other words enabling the listener to sense the directions of the sound sources or the ambience around the listener in the same manner as the original event.

Multichannel playback systems, such as commonly used 5.1 channel setup, can be employed to represent spatial signals with sound sources in different directions. Methods have already been proposed for converting multi-microphone capture to such multichannel spatial signals. Furthermore in addition to multichannel systems, spatial sounds can be represented using binaural signals, in which case the audio is output on headphones and methods for converting multi-microphone captured audio signals to suitable binaural signal representations are also known. These modes of output generally complement each other as binaural signals are generally suitable for mobile use and multichannel setups are used for example at home or at office.

The concept as described herein introduces implementations for generating realistic modifications to the obtained spatial audio field, for example 'virtual' zooming and turning in the audio field. Furthermore the concepts as described by the embodiments herein introduce spatial focusing employing amplifying/dampening sound sources in selected directions using an easy to use user interface (UI). The embodiments as described in detail herein enable these features for any user-captured spatial audio sound. The embodiments described herein further provide additional audio signal enhancement for increasing the synthesized audio quality, such as additional gain control and temporal smoothing operations.

The concept of the application is related to determining suitable audio signal representations from captured audio signals and then processing the representations of the audio signals. For example the processing can include a spatial audio focussing on a determined sector surrounding a position such as a location of the apparatus, a virtual or desired motion of the listener/capture device to a virtual or desired location (including a translational or zooming operation and a rotational operation) to enable suitable spatial audio synthesis to be generated.

There are many use cases for the embodiments as discussed herein. Firstly considering a combination of both audio and video, a suitable UI can be used to select a person or any other sound source from a video screen and zoom in the video picture to that particular source where the audio can be updated to correspond to the new situation. This enables the maintenance of a realistic spatial audio field based on the virtual new location.

Secondly in different virtual or augmented reality applications, audio plays an important role in making the experience more authentic. Recorded audio is typically available in some particular locations, but the number of such locations is limited.

Implementing embodiments as described herein enables the synthesis of audio for a new location by utilizing the nearby audio source/sources, or alternatively to emphasize (amplify) particular sound sources or events.

Thirdly by using a suitable UI in some embodiments, the user can virtually move (zoom) in the spatial audio field and explore different sound sources in different directions more carefully.

Fourthly in teleconferencing applications of the described embodiments, the user can modify the directions in which participants from another location can be heard.

Fifthly by implementing embodiments as described herein a user can more easily concentrate or focus to only certain sound sources or directions by damping other directions.

Sixthly in some embodiments a user can relive recorded experiences via zooming in and rotating the audio field easily.

Seventhly in some embodiments a user is able to remove/dampen unpleasant sound sources from the recording.

Eighthly by implementing some embodiments as described herein when combining the audio with video recording the user can touch the sound sources on the image or video frames to control the dampen/amplify operations easily.

In this regard reference is first made to FIG. 1 which shows a schematic block diagram of an exemplary apparatus or electronic device 10, which may be used to capture or monitor the audio signals, to determine audio source directions/motion and determine whether the audio source motion matches known or determined gestures for user interface purposes.

The apparatus 10 can for example be a mobile terminal or user equipment of a wireless communication system. In some embodiments the apparatus can be an audio player or audio recorder, such as an MP3 player, a media recorder/player (also known as an MP4 player), or any suitable portable device requiring user interface inputs.

In some embodiments the apparatus can be part of a personal computer system an electronic document reader, a tablet computer, or a laptop.

The apparatus 10 can in some embodiments comprise an audio subsystem. The audio subsystem for example can include in some embodiments a microphone or array of microphones 11 for audio signal capture. In some embodiments the microphone (or at least one of the array of microphones) can be a solid state microphone, in other words capable of capturing acoustic signals and outputting a suitable digital format audio signal. In some other embodiments the microphone or array of microphones 11 can comprise any suitable microphone or audio capture means, for example a condenser microphone, capacitor microphone, electrostatic microphone, electret condenser microphone, dynamic microphone, ribbon microphone, carbon microphone, piezoelectric microphone, or microelectrical-mechanical system (MEMS) microphone. The microphone 11 or array of microphones can in some embodiments output the generated audio signal to an analogue-to-digital converter (ADC) 14.

In some embodiments the apparatus and audio subsystem includes an analogue-to-digital converter (ADC) 14 configured to receive the analogue captured audio signal from the microphones and output the audio captured signal in a suitable digital form. The analogue-to-digital converter 14 can be any suitable analogue-to-digital conversion or processing means.

In some embodiments the apparatus 10 and audio subsystem further includes a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can include in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise the audio capture only such that in some embodiments of the apparatus the microphone (for audio capture) and the analogue-to-digital converter are present.

In some embodiments the apparatus audio-video subsystem comprises a camera 51 or image capturing means configured to supply to the processor 21 image data. In some embodiments the camera can be configured to supply multiple images or frames over time to provide a video stream.

In some embodiments the apparatus audio-video subsystem comprises a display 52. The display or image display means can be configured to output visual images of video frames which can be viewed by the user of the apparatus. In some embodiments the display can be a touch screen display suitable for supplying input data to the apparatus. The display can be any suitable display technology, for example the display can be implemented by a flat panel comprising cells of LCD, LED, OLED, or 'plasma' display implementations.

Although the apparatus 10 is shown having both audio/video capture and audio/video presentation components, it would be understood that in some embodiments the apparatus 10 can comprise only the audio capture and audio presentation parts of the audio subsystem such that in some embodiments of the apparatus the microphone (for audio capture) or the speaker (for audio presentation) are present. Similarly in some embodiments the apparatus 10 can comprise one or the other of the video capture and video presentation parts of the video subsystem such that in some embodiments the camera 51 (for video capture) or the display 52 (for video presentation) is present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example source determination, audio source direction estimation, audio source processing and user interface routines.

In some embodiments the apparatus further comprises a memory 22. In some embodiments the processor 21 is coupled to memory 22. The memory 22 can be any suitable storage means. In some embodiments the memory 22 comprises a program code section 23 for storing program codes implementable upon the processor 21 such as those code routines described herein. Furthermore in some embodiments the memory 22 can further comprise a stored data section 24 for storing data, for example audio data that has been captured in accordance with the application or audio data to be processed with respect to the embodiments described herein. The implemented program code stored within the program code section 23, and the data stored within the stored data section 24 can be retrieved by the processor 21 whenever needed via a memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the transceiver is configured to transmit and/or receive the audio signals for processing according to some embodiments as discussed herein.

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

It is to be understood again that the structure of the apparatus 10 could be supplemented and varied in many ways.

Figure 2:
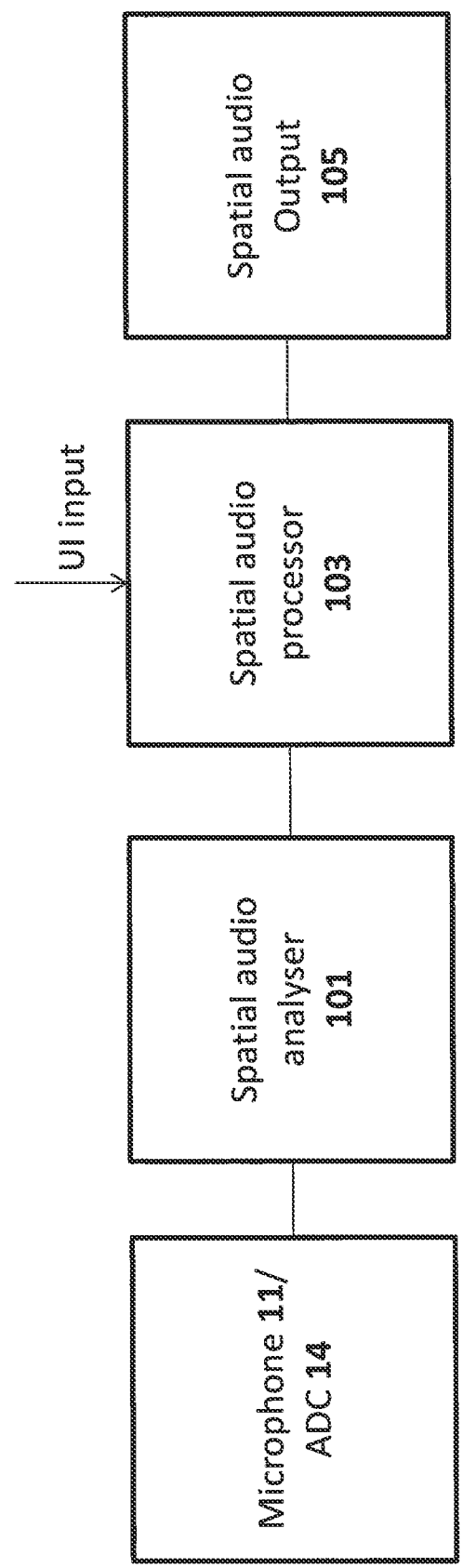
FIG. 2 shows schematically apparatus suitable for implementing embodiments in further detail.

With respect to FIG. 2 the audio processor apparatus according to some embodiments is shown in further detail. Furthermore with respect to FIG. 3 the operation of such apparatus is described.

The apparatus as described herein comprise a microphone array including at least two microphones and an associated analogue-to-digital converter suitable for converting the signals from the microphone array into a suitable digital format for further processing. The microphone array can be, for example located on the apparatus at ends of the apparatus and separated by a distance d. The audio signals can therefore be considered to be captured by the microphone array and passed to a spatial audio analyser 101.

Figure 8:
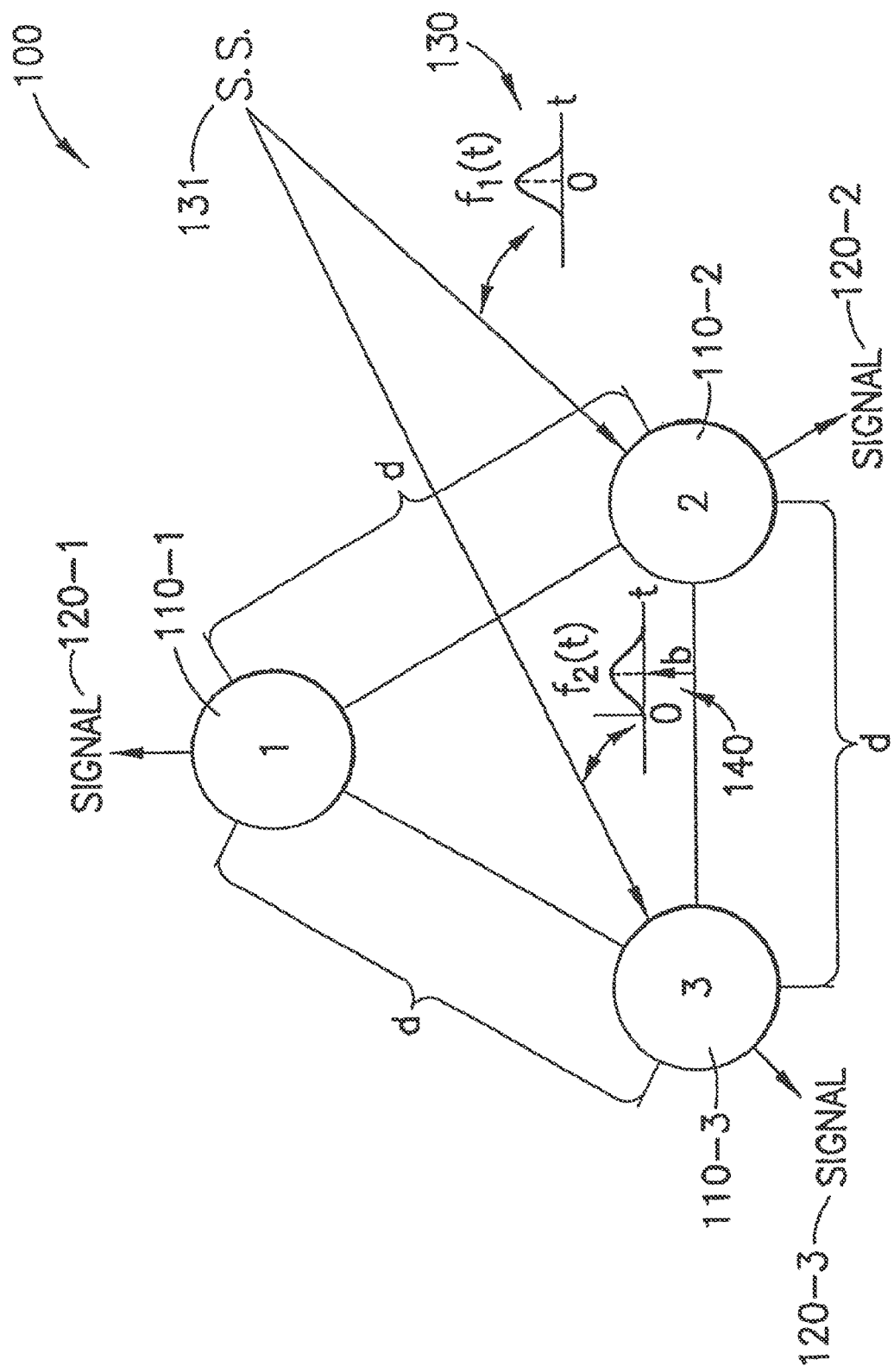
FIG. 8 shows an example microphone-arrangement according to some embodiments.

FIG. 8, for example, shows an example microphone array arrangement of a first microphone 110-1, a second microphone 110-2 and a third microphone 110-3. In this example the microphones are arranged at the vertices of an equilateral triangle.

However the microphones can be arranged in any suitable shape or arrangement. In this example each microphone is separated by a dimension or distance d from each other and each pair of microphones can be considered to be orientated by an angle of 120° from the other two pairs of microphone forming the array. The separation between each microphone is such that the audio signal received from a signal source 131 can arrive at a first microphone, for example microphone 2 110-2 earlier than one of the other microphones, such as microphone 3 110-3. This can for example be seen by the time domain audio signal $f_1(t)$ 120-2 occurring at the first time instance and the same audio signal being received at the third microphone $f_2(t)$ 120-3 at a time delayed with respect to the second microphone signal by a time delay value of b.

In the following examples the processing of the audio signals with respect to a single microphone array pair is described. However it would be understood that any suitable microphone array configuration can be scaled up from pairs of microphones where the pairs define lines or planes which are offset from each other in order to monitor audio sources with respect to a single dimension, for example azimuth or elevation, two dimensions, such as azimuth and elevation and furthermore three dimensions, such as defined by azimuth, elevation and range.

Figure 3:
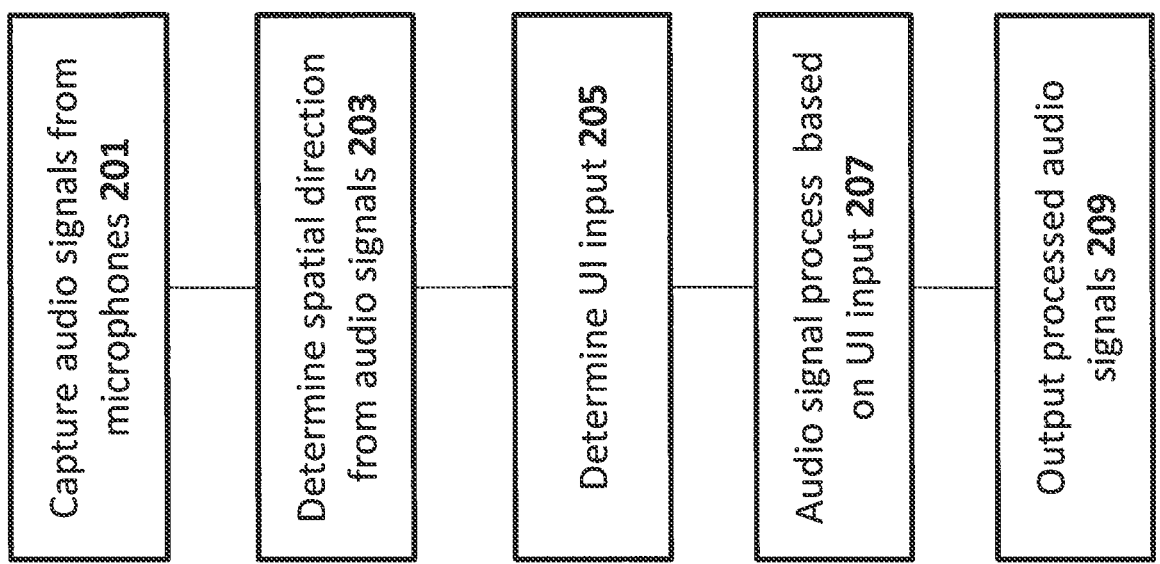
FIG. 3 shows the operation of the apparatus shown in FIG. 2 according to some embodiments.

The operation of capturing acoustic signals or generating audio signals from microphones is shown in FIG. 3 by step 201.

It would be understood that in some embodiments the capturing of audio signals is performed at the same time or in parallel with capturing of images or video frames. Furthermore it would be understood that in some embodiments the generating of audio signals can represent the operation of receiving audio signals or retrieving audio signals from memory. In other words in some embodiments the 'generating' of audio signals can be retrieving previously recorded audio signals with spatial information such that in some embodiments the user can re-live the experience. Also in some embodiments the generating of audio signals operations can include receiving audio signals via a wireless communications link or wired communications link, for example from an audio server containing a large quantity of recorded audio content. In the following examples the generated audio signals are time domain representations of the audio field which are then processed by the spatial audio analyser to generate spatial representations of the audio signals. However it would be understood that in some embodiments the generated audio signals are spatial audio representations and thus can be passed directly to the audio processor 103. For example in some embodiments the apparatus is configured to receive or retrieve stored audio signals in the form of spatial domain representations which are processed by the audio processor 103.

In some embodiments the apparatus comprises a spatial audio analyser 101. The spatial audio analyser 101 is configured to, based on the inputs such as generated audio signals from the microphones or received audio signals via a communications link or from a memory, perform directional analysis to determine an estimate of the direction or location of sound sources, and furthermore in some embodiments generate an audio signal associated with the sound or audio source and of the ambient sounds. The spatial audio analyser 101 then can be configured to output determined directional audio source and ambient sound parameters to an audio processor 103.

The operation of determining audio source and ambient parameters, such as audio source spatial direction estimates from audio signals is shown in FIG. 3 by step 203.

Figure 4:
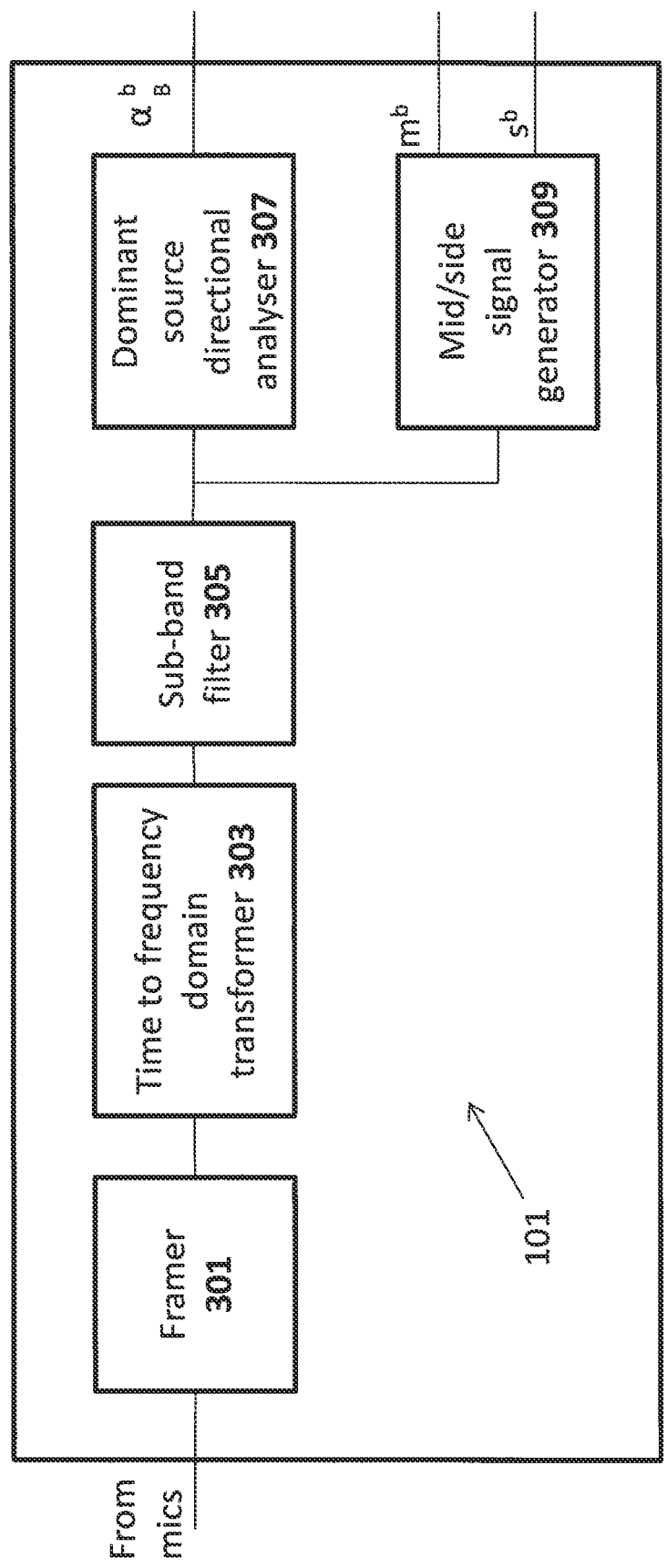
FIG. 4 shows the spatial audio analyser apparatus according to some embodiments.

With respect to FIG. 4 an example spatial audio analyser 101 is shown in further detail. It would be understood that any suitable method of estimating the direction of the arriving sound can be performed other than the apparatus described herein. For example the directional analysis can in some embodiments be carried out in the time domain rather than in the frequency domain as discussed herein.

Figure 5:
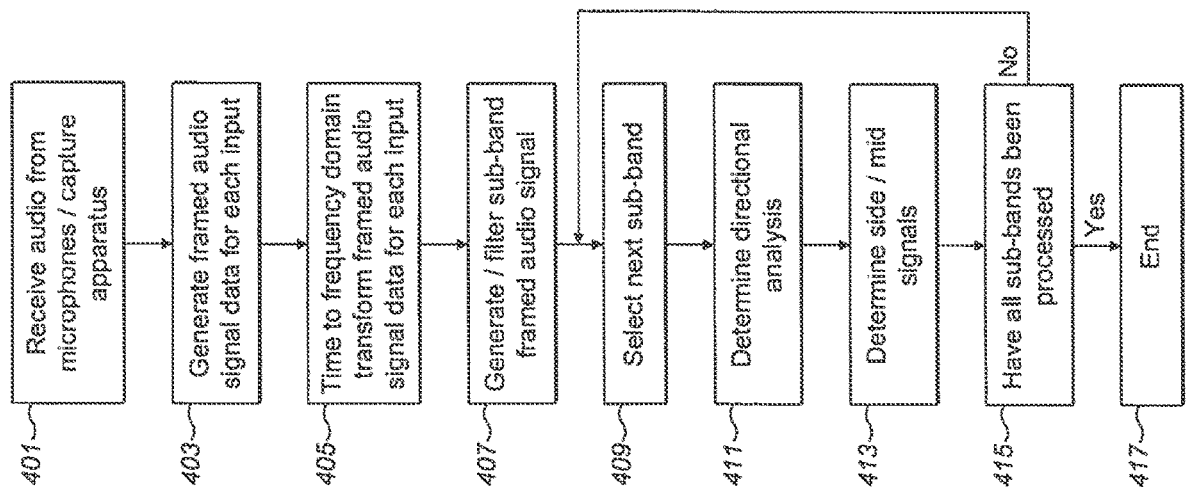
FIG. 5 shows a flow diagram of the operation of the spatial audio analyser apparatus according to some embodiments.

With respect to FIG. 5, the operation of the spatial audio analyser shown in FIG. 4 is described in further detail.

The apparatus can as described herein comprise a microphone array including at least two microphones and an associated analogue-to-digital converter suitable for converting the signals from the microphone array at least two microphones into a suitable digital format for further processing. The microphones can be, for example, be located on the apparatus at ends of the apparatus and separated by a distance d. The audio signals can therefore be considered to be captured by the microphone and passed to a spatial audio analyser 101.

The operation of receiving audio signals is shown in FIG. 5 by step 401.

In some embodiments the spatial audio analyser 101 comprises a framer 301. The framer 301 can be configured to receive the audio signals from the microphones and divide the digital format signals into frames or groups of audio sample data. In some embodiments the framer 301 can furthermore be configured to window the data using any suitable windowing function. The framer 301 can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer 301 can be configured to output the frame audio data to a Time-to-Frequency Domain Transformer 303.

The operation of framing the audio signal data is shown in FIG. 5 by step 403.

In some embodiments the spatial audio analyser 101 is configured to comprise a Time-to-Frequency Domain Transformer 303. The Time-to-Frequency Domain Transformer 303 can be configured to perform any suitable time-to-frequency domain transformation on the frame audio data. In some embodiments the Time-to-Frequency Domain Transformer can be a Discrete Fourier Transformer (DTF). However the Transformer can be any suitable Transformer such as a Discrete Cosine Transformer (DCT), a Modified Discrete Cosine Transformer (MDCT), or a quadrature mirror filter (QMF). The Time-to-Frequency Domain Transformer 303 can be configured to output a frequency domain signal for each microphone input to a sub-band filter 305.

The operation of transforming each signal from the microphones into a frequency domain, which can include framing the audio data, is shown in FIG. 5 by step 405.

In some embodiments the spatial audio analyser 101 comprises a sub-band filter 305. The sub-band filter 305 can be configured to receive the frequency domain signals from the Time-to-Frequency Domain Transformer 303 for each microphone and divide each microphone audio signal frequency domain signal into a number of sub-bands. In the following examples the sub-band filter 305 is configured to generate B sub-bands which are indexed herein by the value $b \in [0, B-1]$.

The sub-band division can be any suitable sub-band division. For example in some embodiments the sub-band filter 305 can be configured to operate using psycho-acoustic filtering bands. The sub-band filter 305 can then be configured to output each domain range sub-band to a direction analyser 307.

The operation of dividing the frequency domain range into a number of sub-bands for each audio signal is shown in FIG. 5 by step 407.

In some embodiments the spatial audio analyser 101 can comprise a direction analyser 307. The direction analyser 307 can in some embodiments be configured to select a sub-band and the associated frequency domain signals for each microphone of the sub-band.

The operation of selecting a sub-band is shown in FIG. 5 by step 409.

The direction analyser 307 can then be configured to perform directional analysis on the signals in the sub-band. The directional analyser 307 can be configured in some embodiments to perform a cross correlation between the microphone pair sub-band frequency domain signals.

In the direction analyser 307 the delay value of the cross correlation is found which maximises the cross correlation product of the frequency domain sub-band signals. This delay shown in FIG. 8 as time value b can in some embodiments be used to estimate the angle or represent the angle from the dominant audio signal source for the sub-band. This angle can be defined as a. It would be understood that whilst a pair or two microphones can provide a first angle, an improved directional estimate can be produced by using more than two microphones and preferably in some embodiments more than two microphones on two or more axes.

The operation of performing a directional analysis on the signals in the sub-band is shown in FIG. 5 by step 411.

Specifically in some embodiments this direction analysis can be defined as receiving the audio sub-band data. With respect to FIG. 6 the operation of the direction analyser according to some embodiments is shown. The direction analyser received the sub-band data;

$$X_k^b(n) = X_k(n_b + n), n = 0, \ldots, n_{b+1} - n_b - 1, b = 0, \ldots, B-1$$

where $n_b$ is the first index of bth subband. In some embodiments for every subband the directional analysis as described herein as follows. First the direction is estimated with two channels (in the example shown in FIG. 8 the implementation shows the use of channels 2 and 3 i.e. microphones 2 and 3). The direction analyser finds delay $\tau_b$ that maximizes the correlation between the two channels for subband b. DFT domain representation of e.g. $X_k^b(n)$ can be shifted $\tau_b$ time domain samples using $$X_{k,\tau_b}^b(n) = X_k^b(n) e^{-j\frac{2\pi n \tau_b}{N}}.$$

The optimal delay in some embodiments can be obtained from $$\max_{\tau_b} \text{Re} \left( \sum_{n=0}^{n_{b+1}-n_b-1} \left( X_{2,\tau_b}^b(n)^\sim X_3^b(n) \right) \right), \tau_b \in [-D_{tot}, D_{tot}]$$

where Re indicates the real part of the result and * denotes complex conjugate. $X_{2,\tau_b}^b$ and $X_3^b$ are considered vectors with length of $n_{b+1} - n_b$ samples. The direction analyser can in some embodiments implement a resolution of one time domain sample for the search of the delay.

Figure 6:
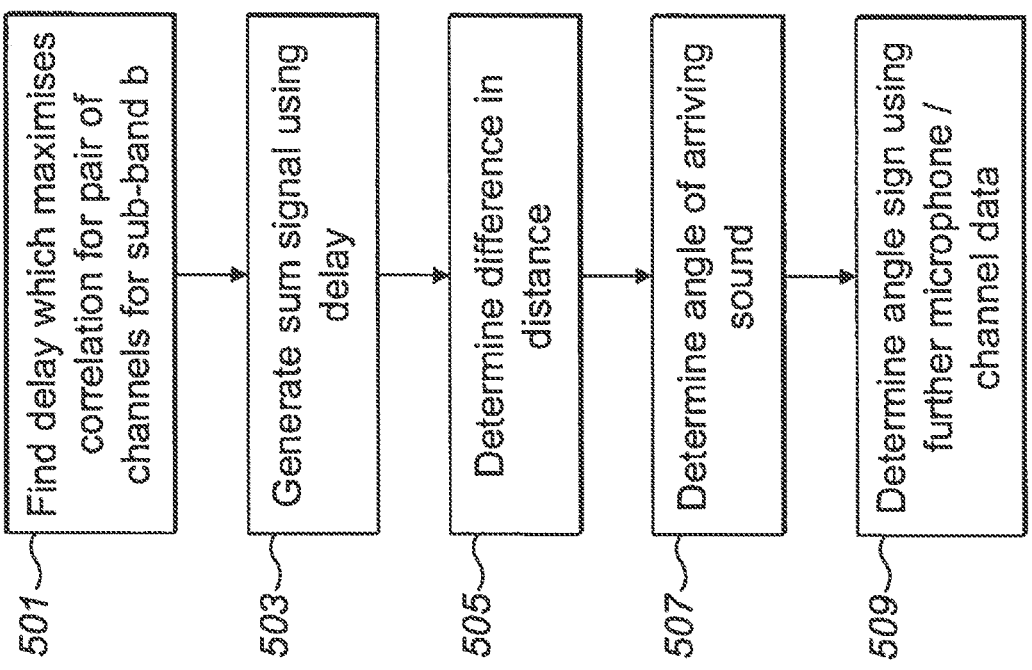
FIG. 6 shows a flow diagram of the operation of the directional analysis of the captured audio signals within the spatial audio analyser apparatus according to some embodiments.

The operation of finding the delay which maximises correlation for a pair of channels is shown in FIG. 6 by step 501.

In some embodiments the direction analyser with the delay information generates a sum signal. The sum signal can be mathematically defined as.

$$X_{sum}^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

In other words the direction analyser is configured to generate a sum signal where the content of the channel in which an event occurs first is added with no modification, whereas the channel in which the event occurs later is shifted to obtain best match to the first channel.

The operation of generating the sum signal is shown in FIG. 6 by step 503.

It would be understood that the delay or shift $\tau_b$ indicates how much closer the sound source is to the microphone 2 than microphone 3 (when $\tau_b$ is positive sound source is closer to microphone 2 than microphone 3). The direction analyser can be configured to determine actual difference in distance as $$\Delta_{23} = \frac{v \tau_b}{F_s}$$

where Fs is the sampling rate of the signal and v is the speed of the signal in air (or in water if we are making underwater recordings).

The operation of determining the actual distance is shown in FIG. 6 by step 505.

The angle of the arriving sound is determined by the direction analyser as, $$\dot{\alpha}_b = \pm \cos^{-1}\left(\frac{\Delta_{23}^2 + 2r\Delta_{23} - d^2}{2dr}\right)$$

where d is the distance between the pair of microphones and r is the estimated distance between sound sources and nearest microphone. In some embodiments the direction analyser can be configured to set the value of r to a fixed value. For example r=2 meters has been found to provide stable results.

The operation of determining the angle of the arriving sound is shown in FIG. 6 by step 507.

It would be understood that the determination described herein provides two alternatives for the direction of the arriving sound as the exact direction cannot be determined with only two microphones.

In some embodiments the directional analyser can be configured to use audio signals from a third channel or the third microphone to define which of the signs in the determination is correct. The distances between the third channel or microphone (microphone 1 as shown in FIG. 8) and the two estimated sound sources are:

$$\delta^+ = \sqrt{(h + r\sin(\dot{\alpha}_b))^2 + (d/2 + r\cos(\dot{\alpha}_b))^2}$$

$$\delta^- = \sqrt{(h - r\sin(\dot{\alpha}_b))^2 + (d/2 + r\cos(\dot{\alpha}_b))^2}$$

where h is the height of the equilateral triangle, i.e.

$$h = \frac{\sqrt{3}}{2}d.$$

The distances in the above determination can be considered to be equal to delays (in samples) of;

$$\tau_b^+ = \frac{\delta^+ - r}{v}F_s$$

$$\tau_b^- = \frac{\delta^- - r}{v}F_s$$

Out of these two delays the direction analyser in some embodiments is configured to select the one which provides better correlation with the sum signal. The correlations can for example be represented as $$c_b^+ = \text{Re}\left(\sum_{n=0}^{n_{b+1}-n_b-1}\left(X_{sum,\tau_b^+}^b(n)^*X_1^b(n)\right)\right)$$

$$c_b^- = \text{Re}\left(\sum_{n=0}^{n_{b+1}-n_b-1}\left(X_{sum,\tau_b^-}^b(n)^*X_1^b(n)\right)\right)$$

The directional analyser can then in some embodiments determine the direction of the dominant sound source for subband b as:

$$\alpha_b = \begin{cases} \dot{\alpha}_b & c_b^+ \geq c_b^- \\ -\dot{\alpha}_b & c_b^+ < c_b^- \end{cases}.$$

The operation of determining the angle sign using further microphone/channel data is shown in FIG. 6 by step 509.

The operation of determining the directional analysis for the selected sub-band is shown in FIG. 5 by step 411.

Figure 7:
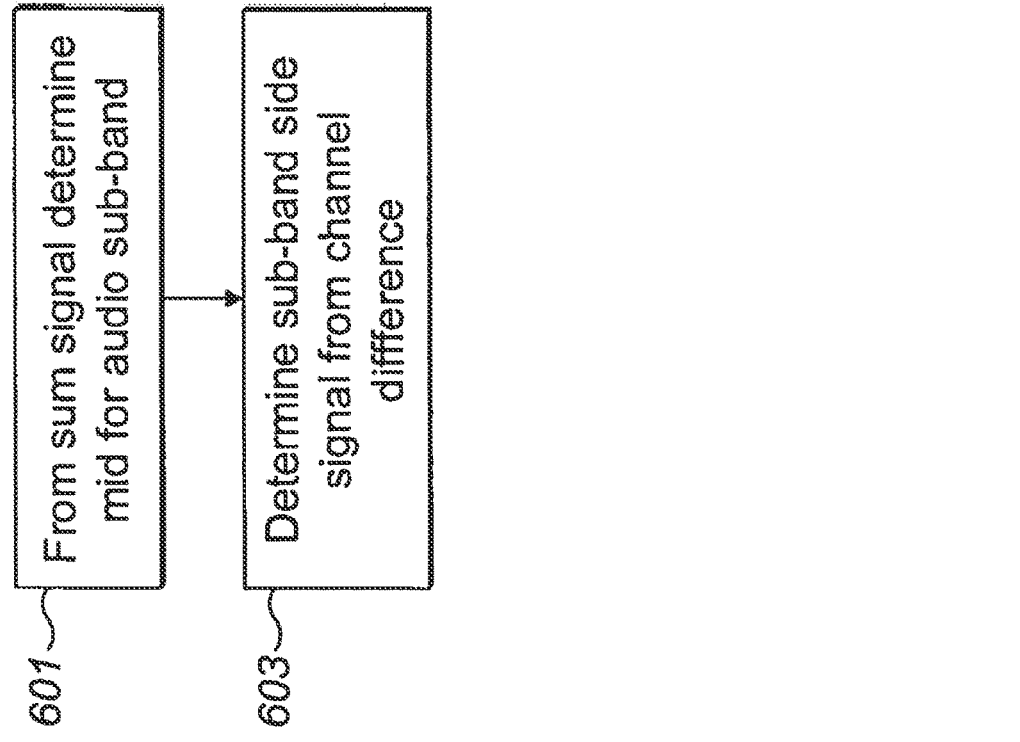
FIG. 7 shows a flow diagram of the operation of the mid/side signal generator according to some embodiments.

In some embodiments the spatial audio analyser 101 further comprises a mid/side signal generator 309. The operation of the mid/side signal generator 309 according to some embodiments is shown in FIG. 7.

Following the directional analysis, the mid/side signal generator 309 can be configured to determine the mid and side signals for each sub-band. The main content in the mid signal is the dominant sound source found from the directional analysis. Similarly the side signal contains the other parts or ambient audio from the generated audio signals. In some embodiments the mid/side signal generator 309 can determine the mid M and side S signals for the sub-band according to the following equations:

$$M^b = \begin{cases} \left(X_{2,\tau_b}^b + X_3^b\right)/2 & \tau_b \leq 0 \\ \left(X_2^b + X_{3,-\tau_b}^b\right)/2 & \tau_b > 0 \end{cases}$$

$$S^b = \begin{cases} \left(X_{2,\tau_b}^b + X_3^b\right)/2 & \tau_b \leq 0 \\ \left(X_2^b + X_{3,-\tau_b}^b\right)/2 & \tau_b > 0 \end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. The mid and side signals can be determined in such a manner in some embodiments is suitable where the microphones are relatively close to each other. Where the distance between the microphones is significant in relation to the distance to the sound source then the mid/side signal generator can be configured to perform a modified mid and side signal determination where the channel is always modified to provide a best match with the main channel.

The operation of determining the mid signal from the sum signal for the audio sub-band is shown in FIG. 7 by step 601.

The operation of determining the sub-band side signal from the channel difference is shown in FIG. 7 by step 603.

The operation of determining the side/mid signals is shown in FIG. 5 by step 413.

The operation of determining whether or not all of the sub-bands have been processed is shown in FIG. 5 by step 415.

Where all of the sub-bands have been processed, the end operation is shown in FIG. 5 by step 417.

Where not all of the sub-bands have been processed, the operation can pass to the operation of selecting the next sub-band shown in FIG. 5 by step 409.

In some embodiments the apparatus comprises an audio processor 103. The spatial audio motion determiner is in some embodiments configured to receive a user interface input.

With respect to FIGS. 9 to 18 examples of suitable user interface inputs are described.

Figure 9:
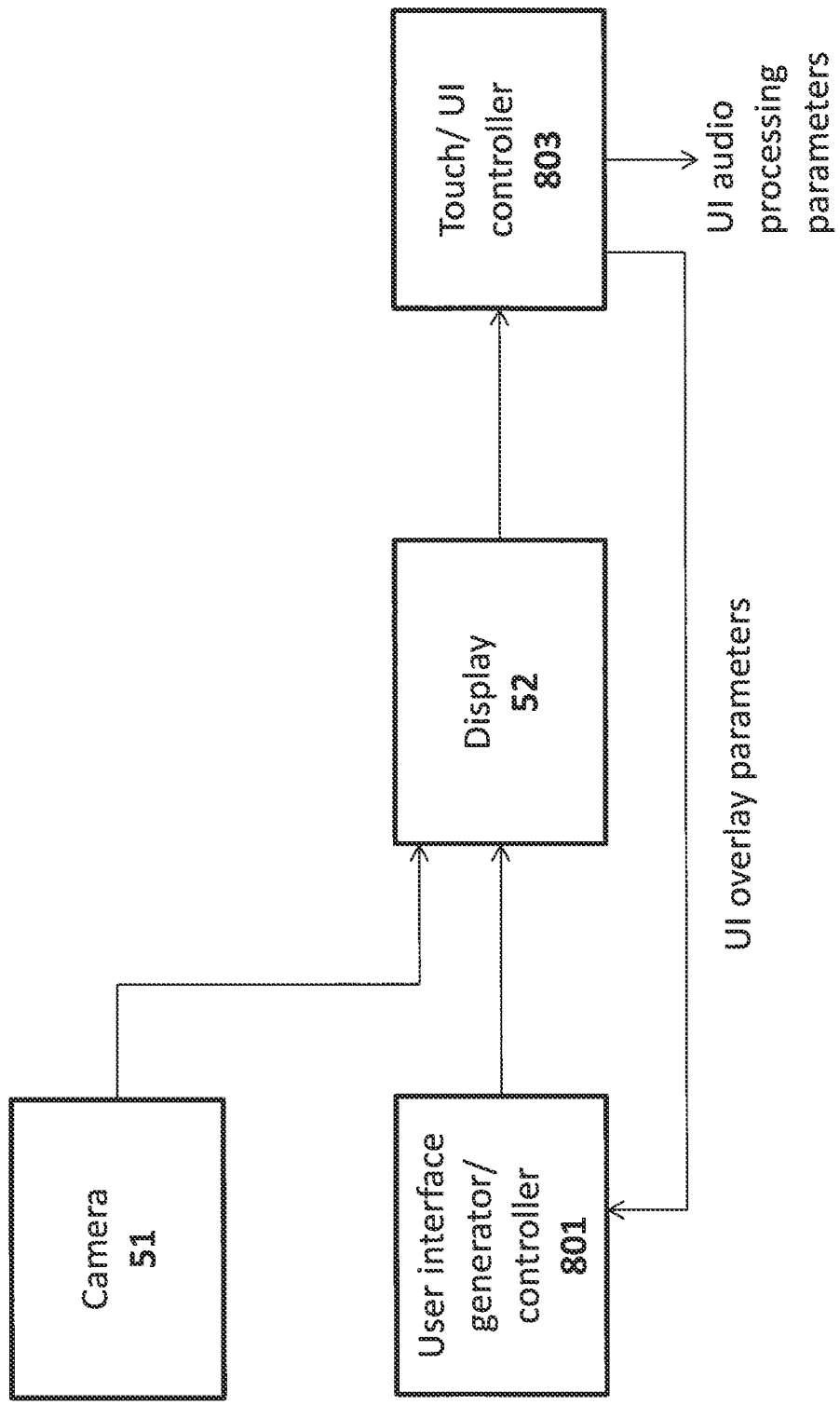
FIG. 9 shows an example user interface apparatus according to some embodiments.

With respect to FIG. 9 an overview of the user interface apparatus configured to generate a suitable user interface input is shown. Furthermore with respect to FIG. a flow diagram showing the operation of the user interface apparatus according to some embodiments as shown in FIG. 9 is further described.

In some embodiments the user interface apparatus comprises a camera 51. The camera 51 as described herein can be configured to capture or record images or video frames and output the images or video frames to a display 52.

Figure 10:
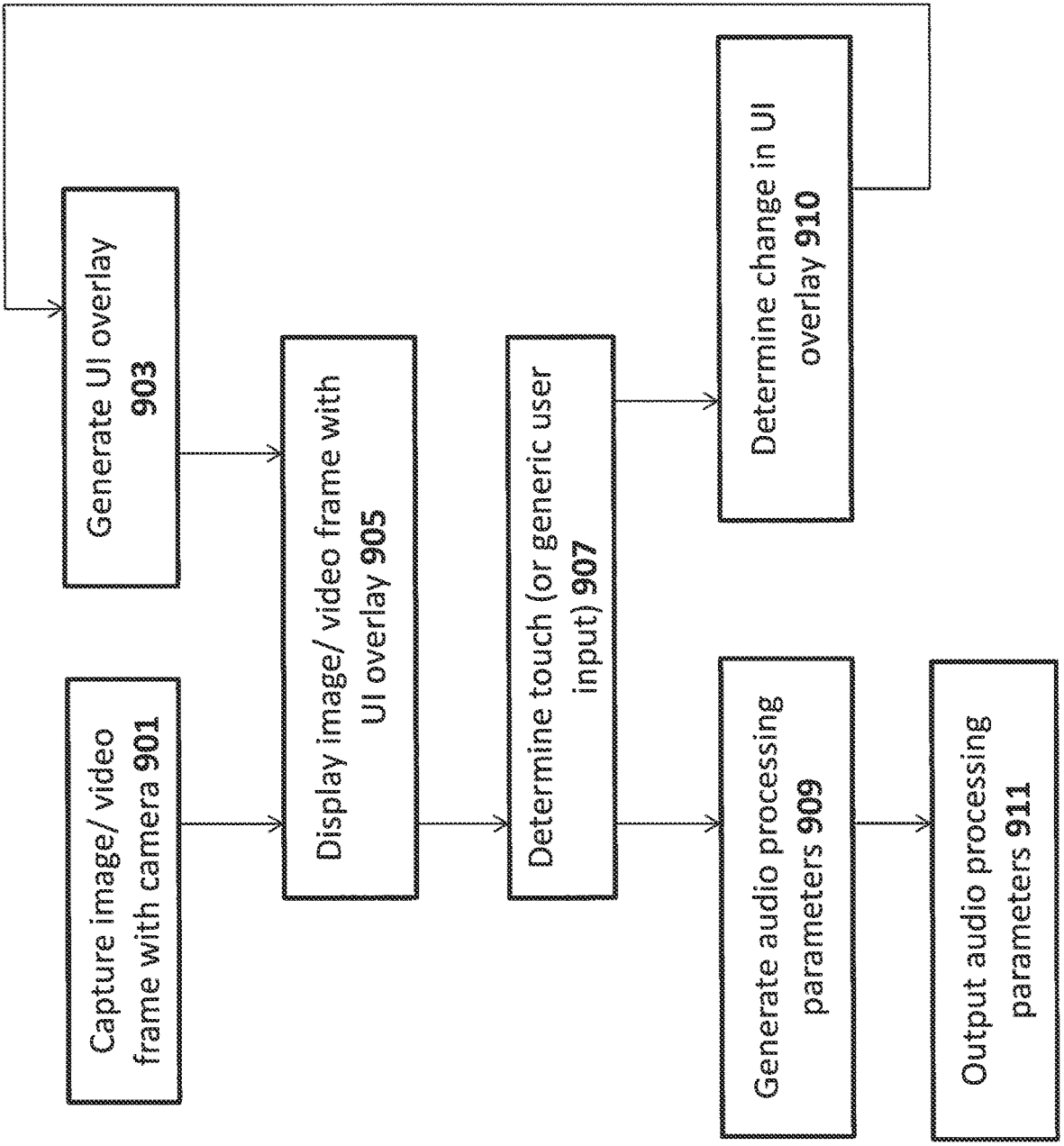
FIG. 10 shows a flow diagram of the operation of the example user interface apparatus as shown in FIG. 9 according to some embodiments.

The operation of capturing images or video frames with the camera is shown in FIG. 10 by step 901.

Furthermore in some embodiments the apparatus comprises a user interface generator/controller 801. The user interface generator/controller 801 is configured to generate a suitable user interface overlay and output the suitable user interface overlay to a display 52.

The operation of generating a user interface overlay is shown in FIG. 10 by step 903.

Furthermore in some embodiments the user interface apparatus comprises a display 52 configured to receive the captured images or video frames from the camera and the user interface overlay from the user interface generator/controller 801 and display the image or video frames on the display with a user interface overlay.

The operation of displaying the image or video frame with a user interface overlay is shown in FIG. 10 by step 905.

It would be understood that in some embodiments the user interface overlay is displayed only, in other words there is no camera image or video frame input.

In some embodiments the display 52 is a suitable touch screen interface and therefore can be configured to receive a user's touch. The display 52 can output this touch sensor output to a touch/user interface controller 803.

In some embodiments the user interface apparatus comprises a touch/user interface (UI) controller 803. The touch/user interface controller 803 can be configured to receive the display or any suitable user interface input. Thus in some embodiments the touch/user interface controller 803 can be configured to determine a suitable touch input or any suitable input or generic user input. For example in some embodiments the touch/user interface controller 803 can be configured to determine a suitable input from a keypad, buttons, switches, mouse motions or any input either implemented on the display as part of the user interface overlay or by actual physical components.

The operation of determining a touch (or inputs) is shown in FIG. 10 by step 907.

The touch/UI controller 803 can further be configured to generate audio processing parameters based on the touch or other inputs. These audio processing parameters can be for example a spatial audio focus sector, a spatial audio zooming direction, a spatial audio rotation, or any other of the audio processing parameters as described herein.

The operation of generating audio processing parameters is shown in FIG. 10 by step 909.

Furthermore the touch/UI controller 803 can be configured to output the audio processing parameters to the audio processor 103. In some embodiments the touch/UI controller 803 can further be configured to determine a UI overlay parameter based on the touch or other input. For example the switching or rotating of a sector can enable the touch/user interface controller 803 to generate a UI overlay parameter to cause a suitable required change in the UI overlay sector presented.

The operation of determining the UI overlay parameter is shown in FIG. 10 by step 910.

Furthermore the touch/UI controller can in some embodiments output this UI overlay parameter to the UI interface generator/controller to generate a new or refreshed user interface overlay image.

The outputting of the UI overlay parameter is shown in FIG. 10 by the feedback loop to from step 910 to step 903 where the 'new' UI overlay is generated.

With respect to FIGS. 11 to 18 example UI overlays are shown. As is shown herein the designed graphical user interface (overlays) can be operated during the actual audio capture or recording, editing or processing, or playback or output phases. In such embodiments a suitable user interface provides an easy way to apply the described modifications to the spatial audio field as are discussed with respect to the audio processor. In the following example UI implementations the overlay represents the audio field about the user by a circle where the user (or apparatus) is originally located at the circle centre. Furthermore in the following examples the UI overlays uses a touch UI, such that a user can control all the described features easily and intuitively. For example in some embodiments the user interface overlay is placed on top of a video stream, such that user can click the direction desired for amplification. However it would be understood that in some embodiments the user interface implementation can be purely based on modifying different sound directions during playback mode. Both of these examples are illustrated with respect to FIGS. 11 to 18.

Figure 11:
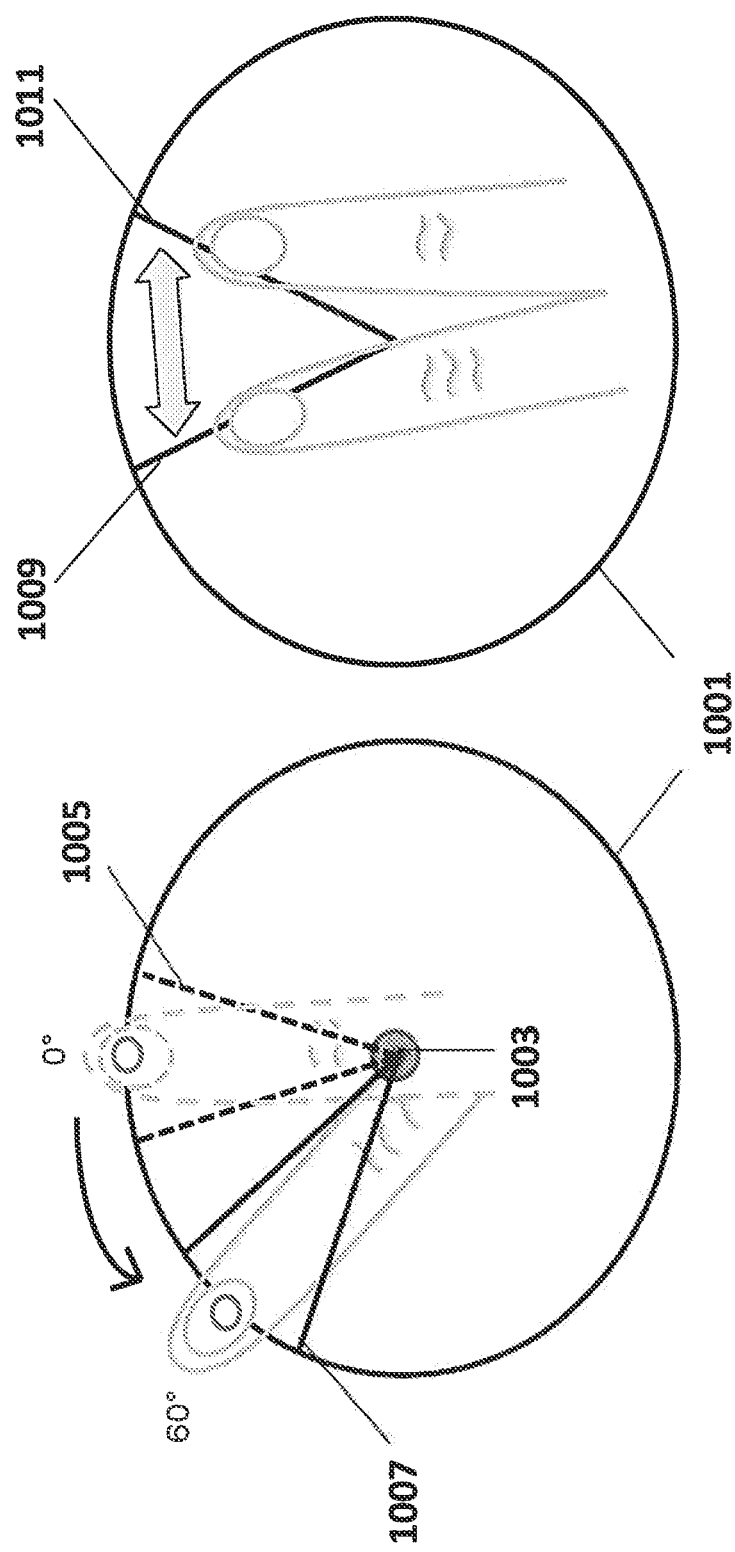
FIG. 11 shows example user interface touch inputs for controlling the focus orientation and the focus width according to some embodiments.

For example FIG. 11 shows an example circular UI overlay 1001, with the UI overlay apparatus location element 1003 on the circle centre. In some embodiments the user interface overlay comprises a focus sector defined by a direction and width. With respect to the left hand side image the change of focus direction is shown wherein a first focus sector direction (the sector represented by the dashed line sector 1005) is changed to a second focus sector direction (the sector represented by the solid line sector 1007) by touching the circle circumference and dragging the focus sector towards the desired direction. This is demonstrated in FIG. 11, where the focus sector is moved from the direct front position (0°) to a left (~60°). Furthermore in some embodiments the sector width can be adjusted by pinching and zooming for example from the sector edges. Thus on the right hand side of FIG. 11 the sector first radius 1009 and second radius 1011 which define the width or angle of the sector are shown with the user pinching the sector wider. In such a way the user interface overlay enables a fluent and versatile UI for controlling the focus sector with unlimited number of different variations.

Figure 12:
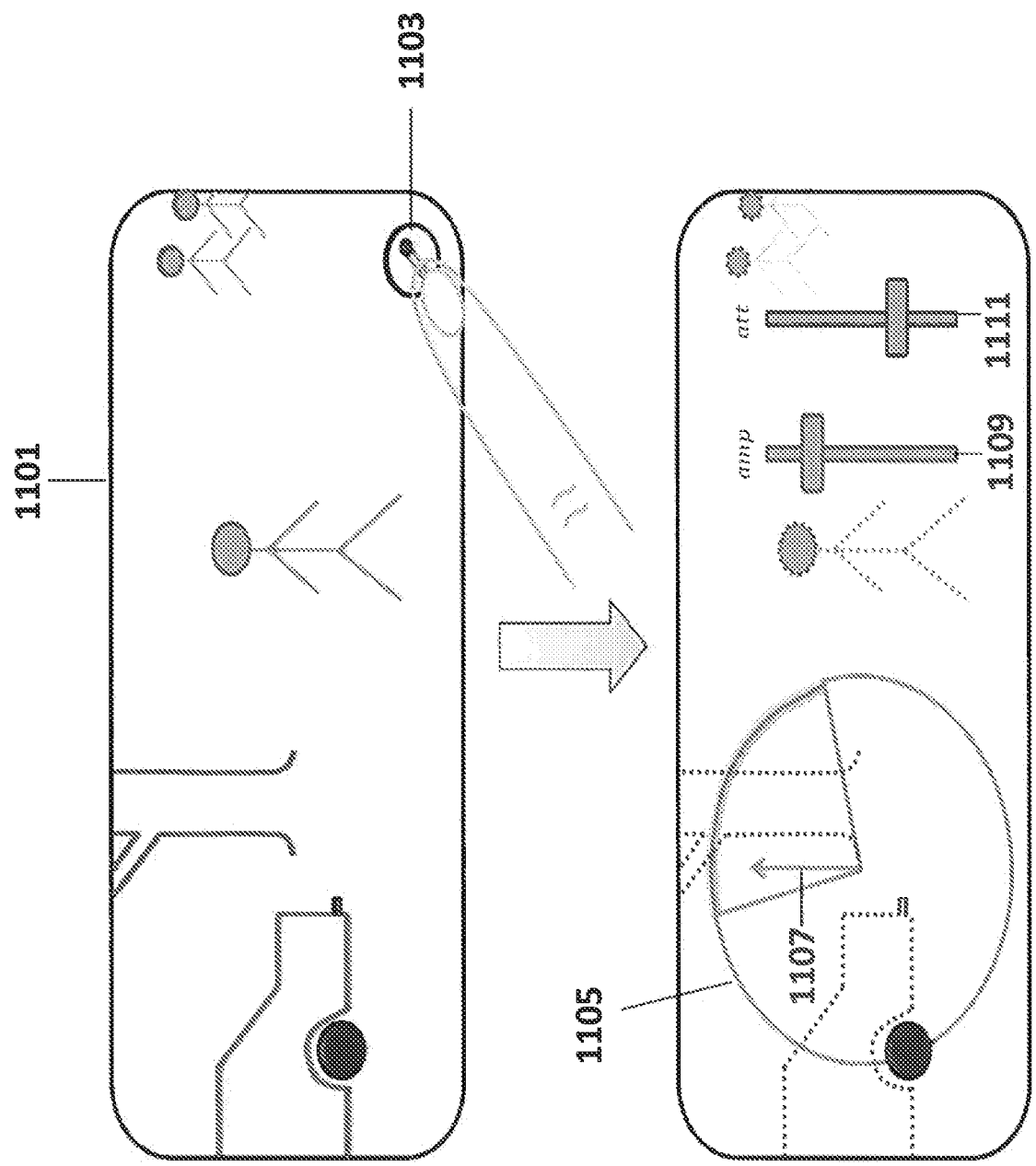
FIG. 12 shows example user interface focus controls overlaying camera images or video frames according to some embodiments.

With respect to FIG. 12 an example of the overlay implemented over an image, for example an image or frame from a video, is shown. In such a way it can be possible to control the audio focus while shooting a video. Furthermore in some embodiments the touch UI of the apparatus can thus be combined with the apparatus camera output to provide an intuitive way to process or modify the gain levels of sound sources within the audio field. As shown in FIG. 12 in some embodiments the UI overlay can be toggled by the use of a UI overlay switch or button UI overlay displayed on the image or video frame. The top part of FIG. 12 thus shows an example image (or video frame) 1101 displayed on the display with a specific "audio zoom" button (microphone icon 1103) on the lower right corner of the apparatus display.

Therefore in some embodiments the Touch/UI controller on determining that the microphone icon 1103 has been touched can be configured to output a parameter to the UI generator/controller to opens or generate another graphical UI on top of the image or video frame (such as shown in the bottom part of FIG. 12), the graphical UI overlay being configured to enable control of the focus direction and width by the circular UI overlay 1105 and furthermore providing UI overlays for controlling the focus gain levels of a specified focus sector. In the example shown in bottom part of FIG. 12 shows the circular UI overlay with an additional arrow 1107 in the circle indicating the direct front direction (in other words the direction of the camera). Furthermore in the example shown in FIG. 12 there are additional UI overlay elements in the form of sliders for adjusting the gain levels for the audio signals within and outside of the focus sector. In some embodiments the gain levels for the audio signals within and outside of the focus sector are defined by amplification and attenuation coefficients amp and att which are determined by the corresponding slider settings 1109 and 1111 respectively. In some embodiments the circular UI overlay can be configured such that colours (or brightness) inside and outside the focus sector are changed according to the slider settings. For example the maximum and minimum coefficient values can correspond to dark red and light blue colours, respectively. In some embodiments the UI overlay switch or button UI overlay is displayed on the image or video frame when the UI control overlay elements are also shown permitting the toggling off of the UI control overlay elements by touching the "audio zoom" button (microphone icon 1103) on the lower right corner of the apparatus display again.

Figure 13:
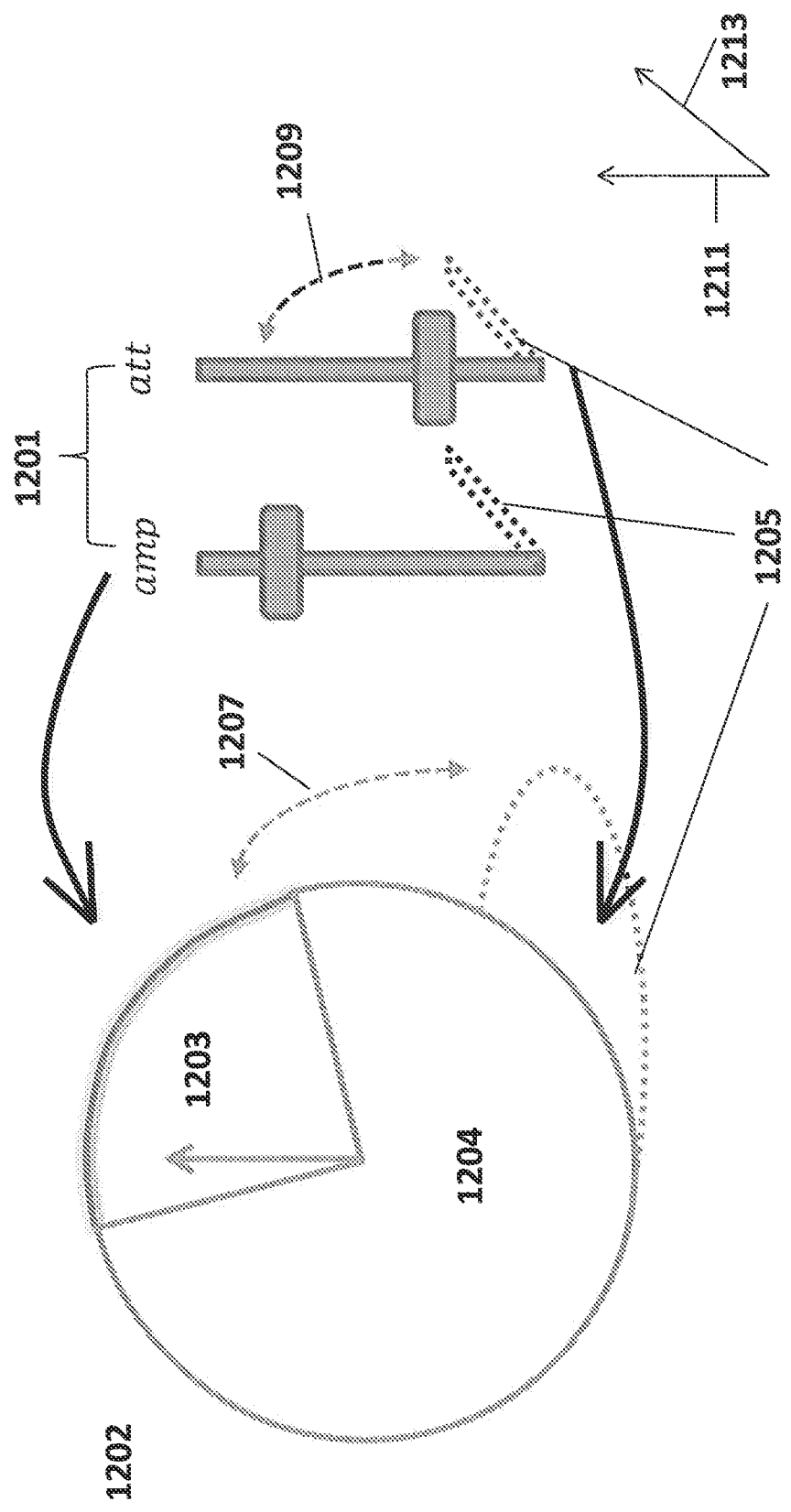
FIG. 13 further shows the example user interface focus controls overlay according to some embodiments.

With respect to FIG. 13 UI control elements are shown without an image or video frame behind them showing the slider UI control element overlay 1201 for determining the amp and att coefficients, the circular UI graphical presentation of the spatial environment overlay 1202 which further comprises the selected focus sector or region UI element 1203, for which the amplification gain is adjusted by the amp slider, and the "out-of-sector" or unfocused region UI element 1204 for which the attenuation gain is adjusted by the att slider.

In some embodiments whenever the audio focus/zooming functionality is enabled but not currently adjusted, the graphical UI control overlay can be displayed such that they are displayed as 'lying' on the filmed scene. This can be shown in FIG. 13 by the dotted line UI control elements 1205. This 'lying' orientation enables the display of the current focus sector in a more intuitive manner, as the user can 'see' the focus sector with respect to the filmed spatial environment.

In some embodiments the UI control overlay can be hidden altogether at the end of the flipping and such the UI controls are not covering the display and hence disturbing the video shooting. In such embodiments whenever a touch or user interface input is detected to enable a control input to adjust a parameter the UI controls can be configured to flip back on their normal orientation (or reappear) where they are easier to operate. This functionality is demonstrated in FIG. 13 by the dashed arrows 1207, 1209 indicate the change between the normal orientation 1211 and the lying UI control orientation 1213.

Figure 14:
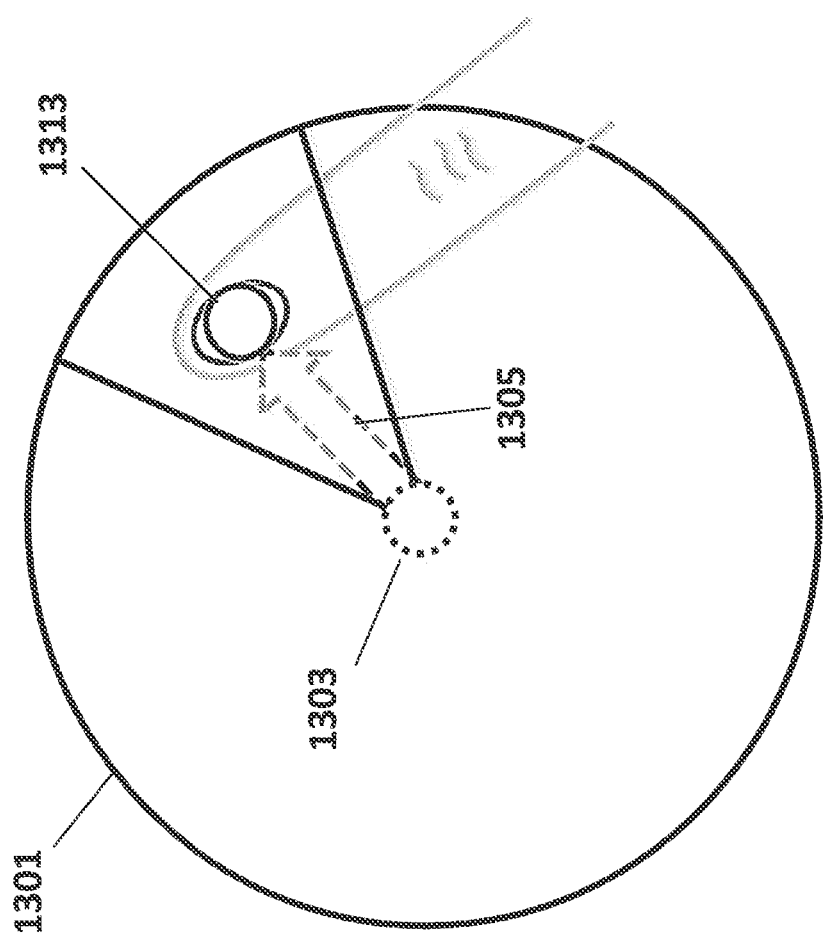
FIG. 14 further shows example user interface zooming controls overlay according to some embodiments.
Figure 15:
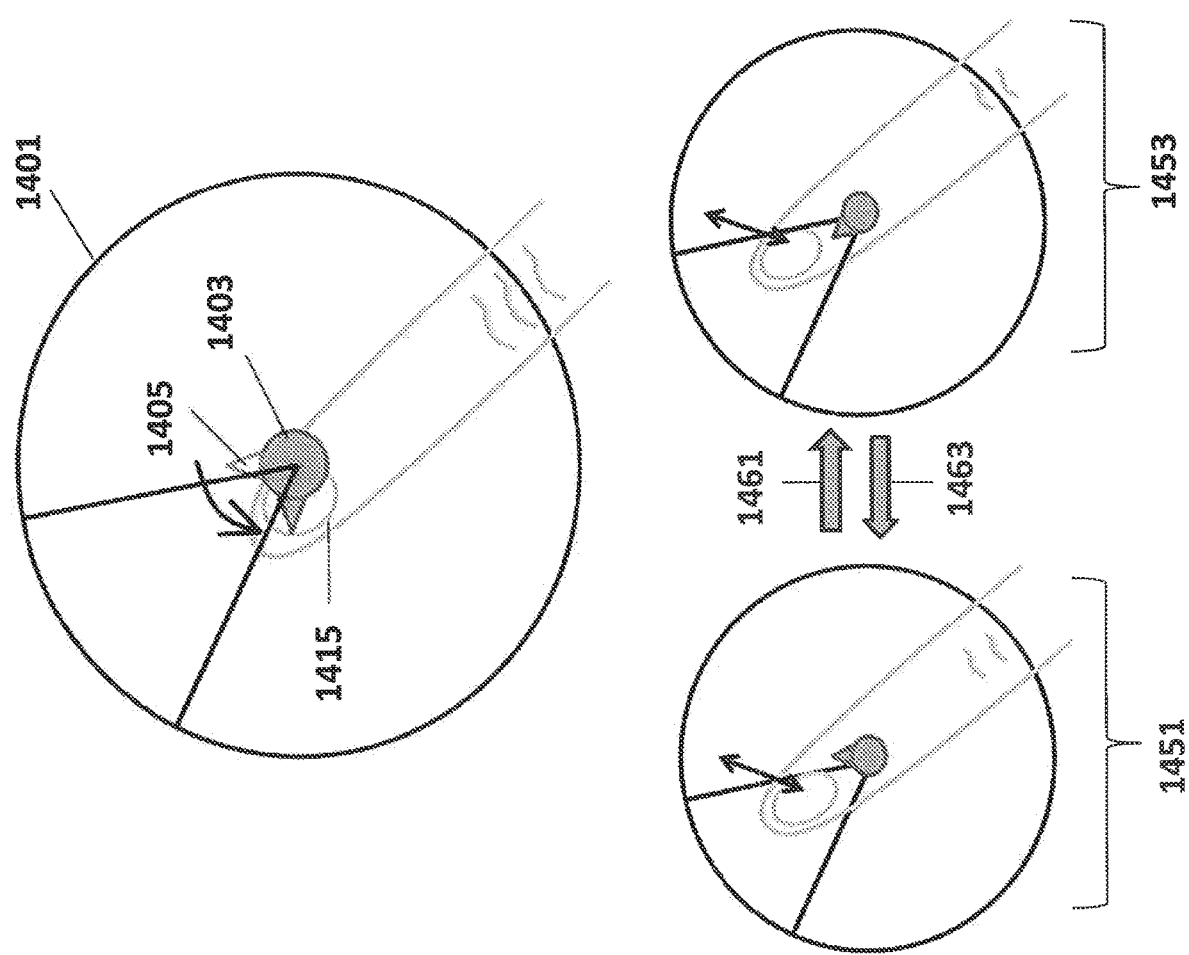
FIG. 15 shows example user interface virtual orientation overlays according to some embodiments.

In some embodiments the audio zooming property is controlled by dragging the current circle centre position towards the desired zooming direction. For example as shown in FIG. 14 the audio zooming direction and distance can be controlled by dragging the UI overlay apparatus icon from the starting position on the circular UI overlay 1301 centre (shown by the dashed line UI overlay apparatus location element 1303) to an end position (shown by the solid line UI overlay apparatus location element 1313). The change in position can be used to determine a changing of the value of a Δx parameter, the amount of zooming or the distance of motion for the zooming as shown in the example in FIG. 30, and can be also thought as a virtual movement in the audio scene.

Furthermore in some embodiments an audio rotation property (or turning towards a desired direction in the audio field) is controlled by touching the current circle centre (the "head" in the middle of the circle) and dragging it towards the desired or wanted direction. This for example can be shown with respect to FIG. 15 where the top image shows a circular UI overlay 1401 centre (shown by the UI overlay apparatus location element 1403), which has a first UI overlay apparatus orientation element 1405 (shown by the hollow triangle) and a second UI overlay apparatus orientation element 1415 (shown by the filled triangle) showing the initial orientation and the rotated orientation. The change in orientation can be used to determine a changing of the rotation parameter and can be also thought as a virtual rotation in the audio scene.

In such a manner information about the current viewing direction is constantly given to the user in a graphical form. In some embodiments a rotation or turning can be controlled directly towards the focus (or zoomed) sector by simply tapping on the apparatus display or device screen inside the desired sector. In some embodiments this tap operation is a toggle operation such that tapping the sector again turns the rotation angle back to the default position of 0°. This toggling operation can be shown with respect to FIG. 15 wherein the lower part shows the toggling of the rotation angle between the left side overlay 1451 where a default position of 0° is shown in the UI overlay apparatus orientation element pointing directly ahead and where a first tap within the sector then causes a rotation to the direction of the sector as shown by the transition arrow 1461 and the right side overlay 1453 showing a change of position of the UI overlay apparatus orientation element towards the tapped sector. Similarly the toggling of the rotation angle between the right side overlay 1453 where a sector orientation rotation is shown in the UI overlay apparatus orientation element pointing towards the sector and where a second or return tap within the sector then causes a rotation back to the directly forward direction as shown by the transition arrow 1463 and the left side overlay 1451 showing a change of position of the UI overlay apparatus orientation element back towards the 0° default position.

In some embodiments the UI interface generator/controller 801 can be configured to generate overlay elements to visualize the directions of the main sound sources. In such embodiments with the source visualization overlay it can be easier for the user to both see the directions of the current sound sources and modify their amplitudes. In some embodiments the visualization overlay can be configured to display the directions of the main sound sources based on a statistical analysis of the analysed audio signals. For example in some embodiments the main sound sources in other words the main directions of the sounds are analysed over several frames to obtain reliable results.

Although the example control of the parameters is shown herein as being defined by a circular UI overlay and associated overlay elements it would be understood that any other suitable method of controlling the focus/zooming/rotation of the sound field can be implemented.

For example controlling the focus/zooming/rotation can in some embodiments be enabled by tapping on the apparatus display or device screen which displays the image or video captured by the camera. In such embodiments the width of the focus sector can be controlled through a graphical UI overlay element on top of the image or video frame on the display by detecting a pinching action. This for example can be seen in FIG. 16 where the image or video frame comprises a person on which the audio scene is desired to be focussed as shown by the UI overlay sector borders 1503, 1505. The pinching action is shown by the fingers which can narrow or widen the distance 1507 between the sector borders 1503, 1505.

Figure 16:
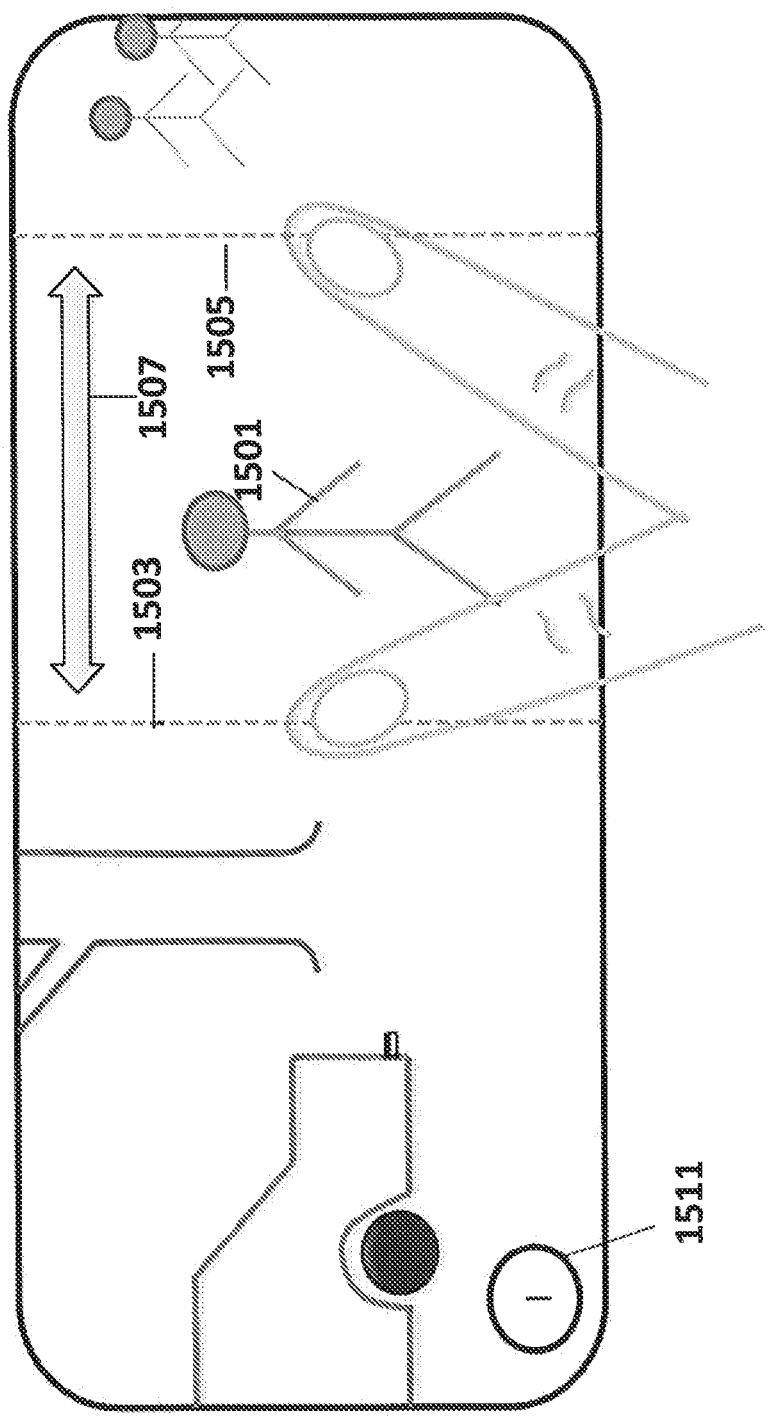
FIG. 16 shows further example user interface focus controls overlaying camera images or video frames according to some embodiments.

In some embodiments an inverse-focusing or filtering-out of audio sources for example in case of some disturbing sound source(s), enabling the audio sources within a selected or chosen sector to be attenuated rather than amplified can be initiated by the use of an "inverse button". This can for example be implemented as an inverse UI overlay toggle, such as shown in FIG. 16 by the "I" inverse UI overlay 1511 on the bottom left of the apparatus display or device screen.

In some embodiments the focus gain can be determined or controlled directly using the regular volume control buttons of the apparatus or device. Furthermore in some embodiments the amount of audio zooming and/or rotation can be determined or controlled based on the amount of image or video zooming or rotation performed with the camera and/or apparatus. For example in some embodiments the focussing and/or zooming and/or rotation of the audio scene processing can be performed either during shooting a video or in the post-shoot editing by turning the apparatus/camera towards a desired direction and using the camera/image zoom controls.

In some embodiments the focus control is performed by adjusting the audio gain for a series of directions surrounding the apparatus.

Figure 17:
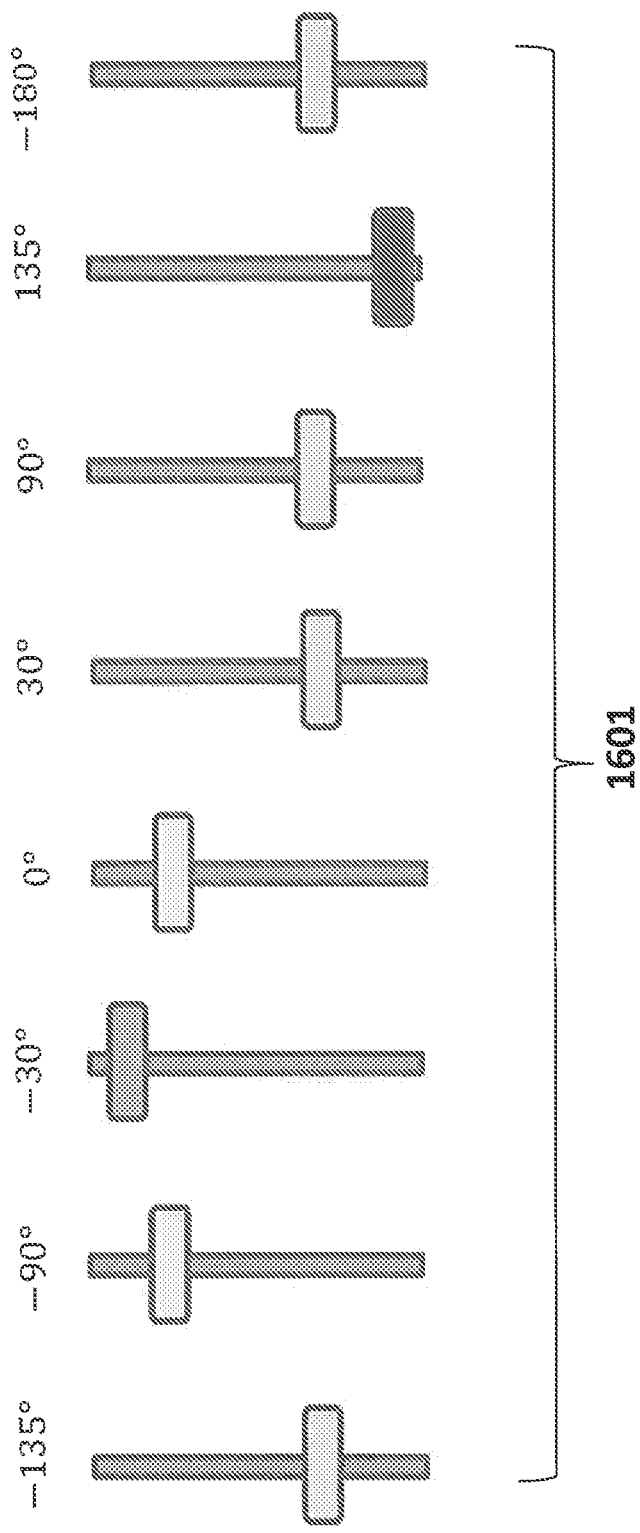
FIG. 17 shows another example user interface focus controls suitable for overlaying camera images or video frames according to some embodiments.

This can for example be implemented by a slider-based UI for controlling the focus gain levels towards each spatial direction. For example as shown in FIG. 17 the user interface shows an example slider bank of 8 sliders 1601 (−135°, −90°, −30°, 0°, 30°, 135°, −180°) at various locations about the apparatus where the position on slider defines the gain/attenuation of audio sources from that orientation. The number of sliders and the configuration of the orientation of the sliders can vary according to some embodiments.

Figure 18:
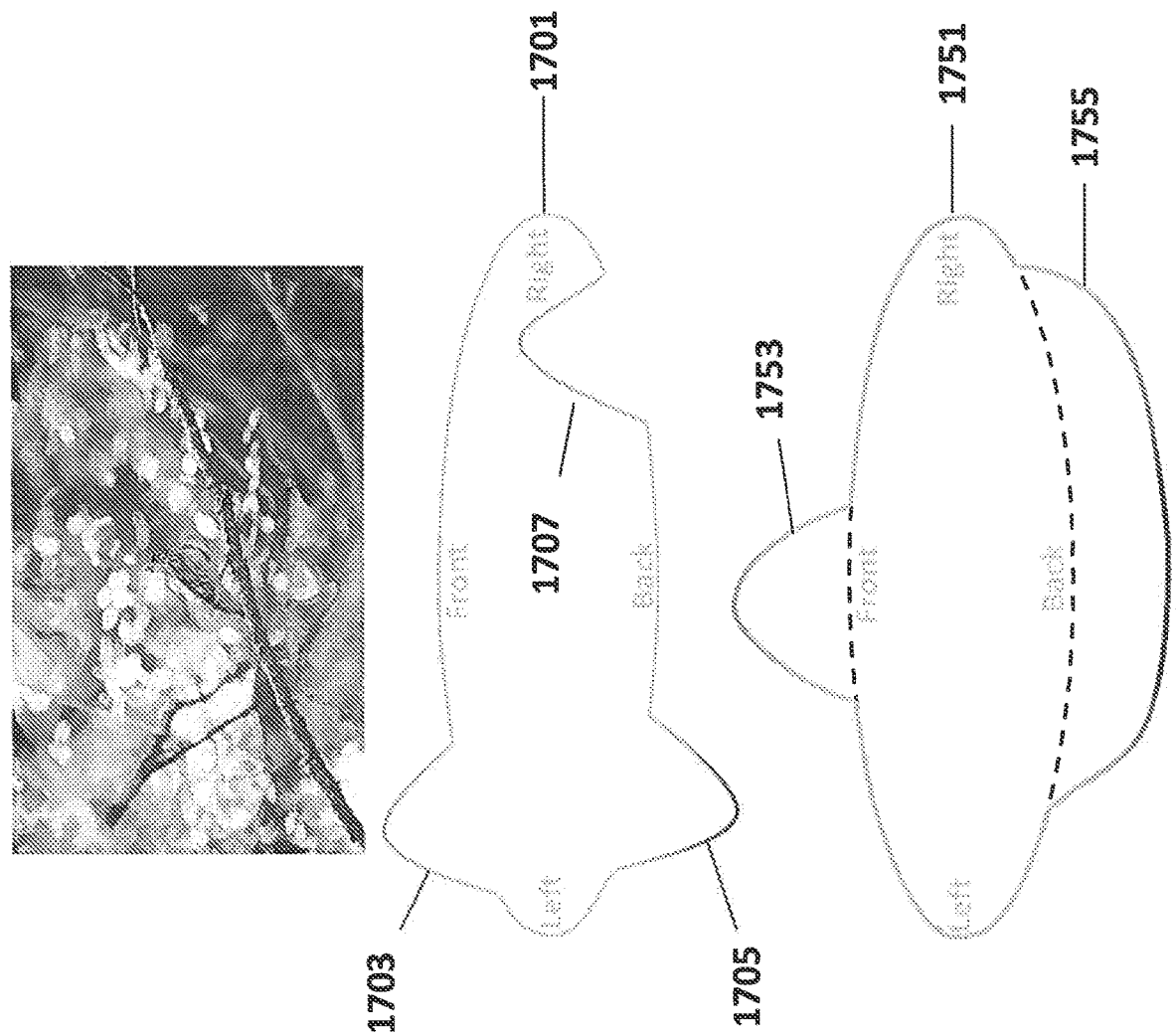
FIG. 18 shows further examples of user interface focus controls according to some embodiments.

In some embodiments a continuous focus control determination can be employed. For example FIG. 18 shows two example UI overlays showing differing focus gain profiles about the apparatus. Each of the UI overlays are in the form of a band or shape which can be interacted with by the user touch (in some embodiments a dragging operation at the edge of the shape can be configured to cause a displacement in the shape and the associated gain/attenuation audio parameter). For example the upper of the two UI overlays 1701 the sounds from front left 1703 and rear left 1705 directions are amplified (as the associated shape curves are located further from the centre of the shape), whereas the sounds from rear right 1707 are attenuated (as the associated share curve is located towards the centre of the shape) by the amount set to the curve shape.

In the example of the lower of the two UI overlays 1751, a spatial audio focus is set to front direction 1753 by the shape curve being located away from the centre of the shape and also to the rear direction 1755 by the shape curve to the rear also being located away from the centre of the shape.

In some embodiments the user interface can be configured to present each sound source based on associated displayed objects. Furthermore in some embodiments the user interface can be configured to present configurable settings (for example the sliders, knobs) so that the user can adjust each sound source independently.

In some embodiments each sound source can be selected and output or played independently. Furthermore in some embodiments where an object is not identified by the user interface (in other words not being able to determine where a sound source is present), then in some embodiments the user interface may treat such sound source as an environmental sound or background sound. In some embodiments such audio sources or environmental sounds can be processed in a manner similar to shown herein (or in other words be adjustable as well).

In some embodiments the processing of determined and/or non-identified (or environmental) audio sources can be provided by user interface options/display settings automatically or via an initial user interface. For example in some embodiments an overlay or icon representing 'audio zoom' or 'audio settings' can be displayed which when selected generates a further set of overlays to be displayed comprising follow up settings/adjustments after the activation/selection. In some embodiments the user can further be allowed to turn such a display icon on/off.

Figure 19:
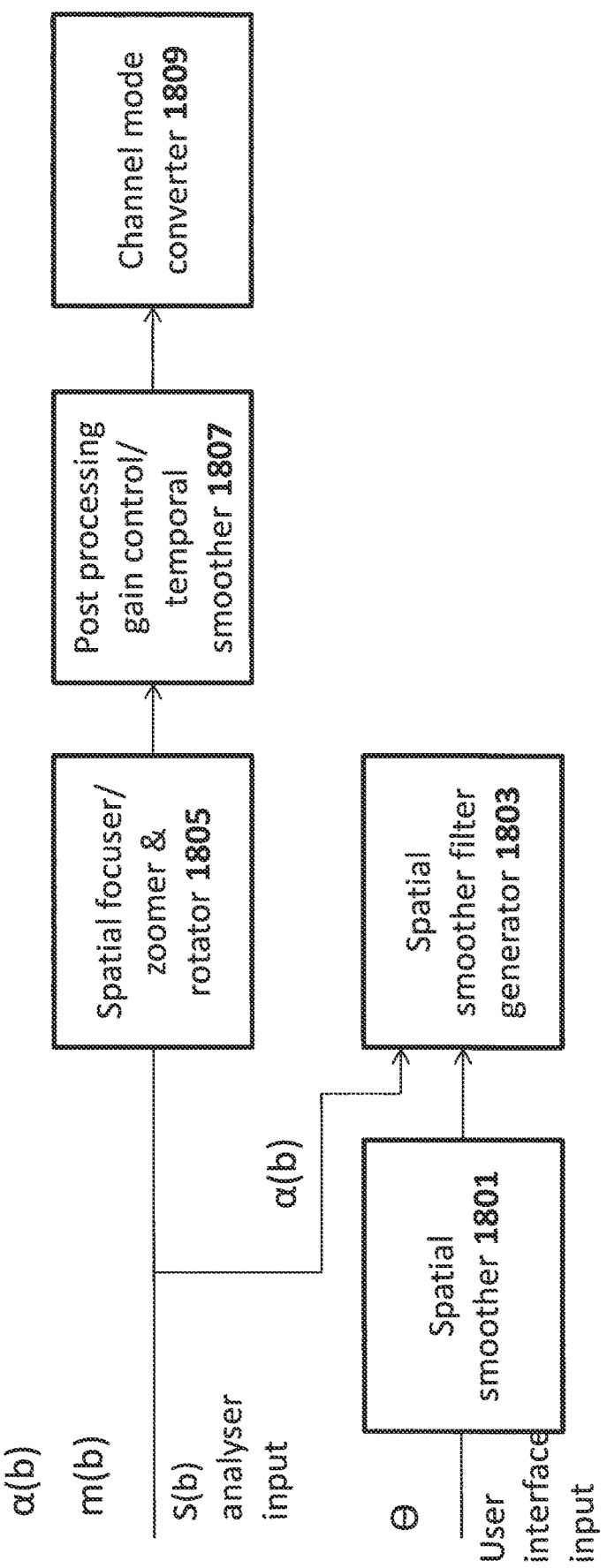
FIG. 19 shows an example audio processor according to some embodiments.

With respect to FIG. 19 an example audio processor 103 is shown in further detail according to some embodiments. Furthermore with respect to FIG. 20 an overview of the operation of the audio processor as shown in FIG. 19 is described in further detail.

In some embodiments the audio processor 103 comprises a spatial smoother 1801 and a spatial smoother filter generator 1803. The spatial smoother 1801 and spatial smoother filter generator 1803 are configured to avoid generating sudden gain "cut-offs" at the defined focus sector edges.

Figure 20:
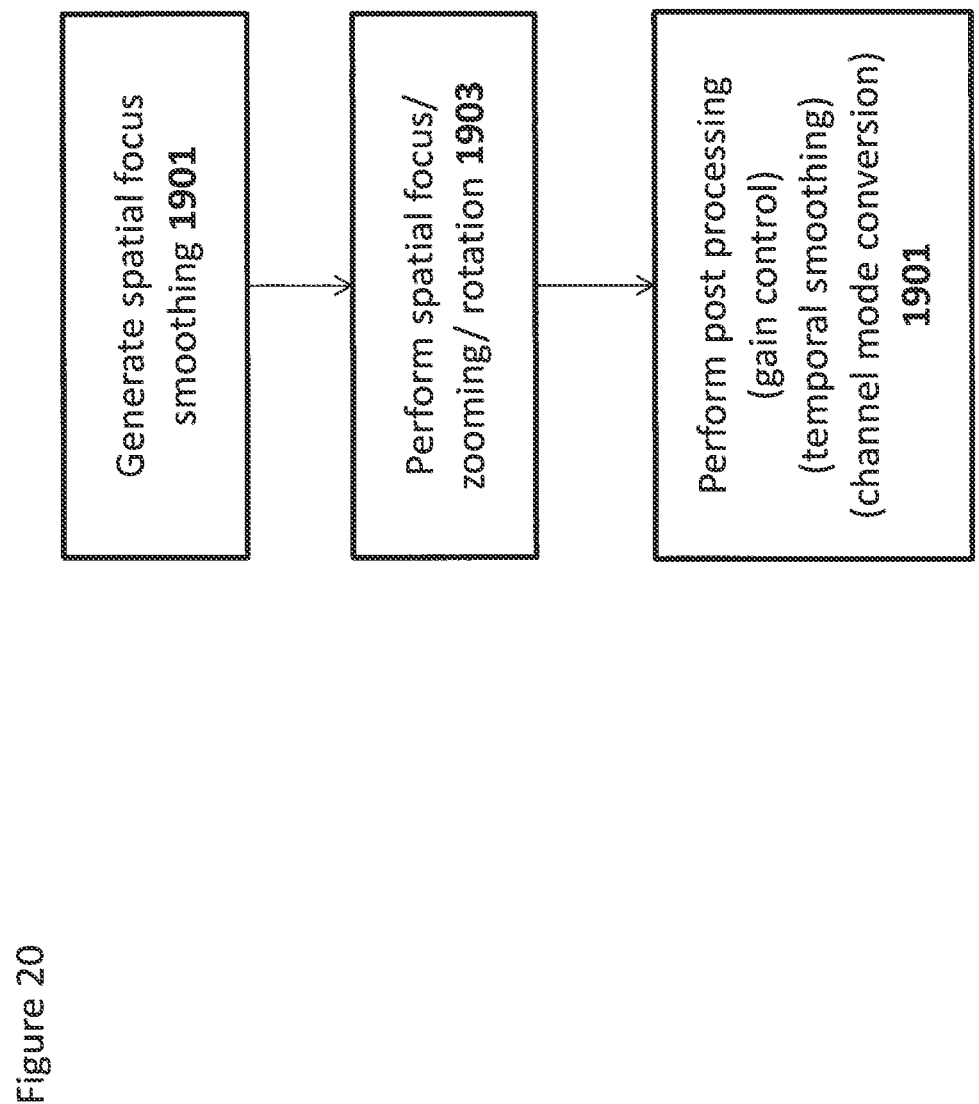
FIG. 20 shows a flow diagram showing the summary of operations of the audio processor as shown in FIG. 19 according to some embodiments.

The operation of generating spatial focus smoothing is shown in FIG. 20 by step 1901.

Figure 21:
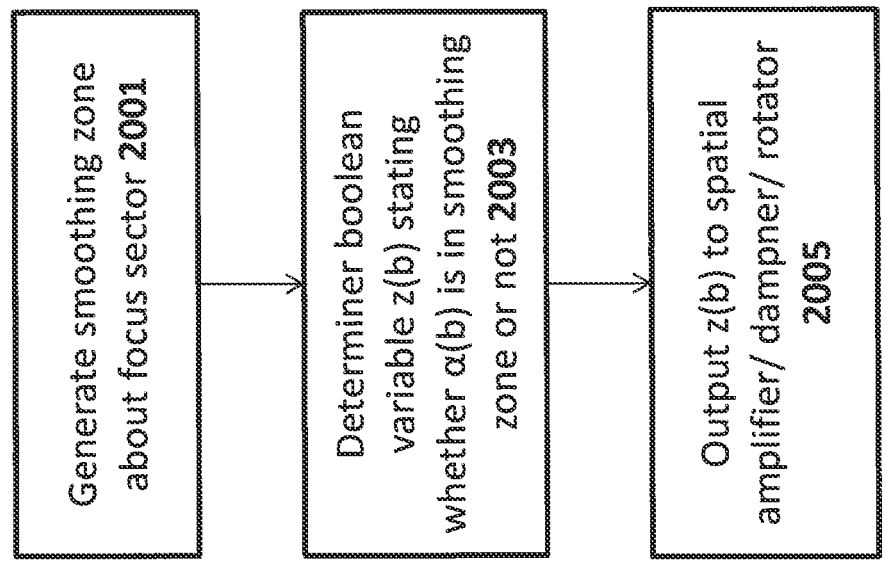
FIG. 21 shows a flow diagram showing the operations of performing spatial smoothing as shown in FIG. 20 according to some embodiments.

With respect to FIG. 21 the operation of generating spatial focus smoothing is shown in further detail. In some embodiments the spatial smoother 1801 is configured to receive the defined focus sector orientation and width and generate additional smoothing zones to both sides of the defined focus sector. For example in some embodiments the defined sector orientation and width are defined by a sector start orientation $\theta_{low}$ and a sector end orientation $\theta_{high}$, the difference of which is therefore the sector width w, and the average or mean of the two is the sector orientation.

Figure 22:
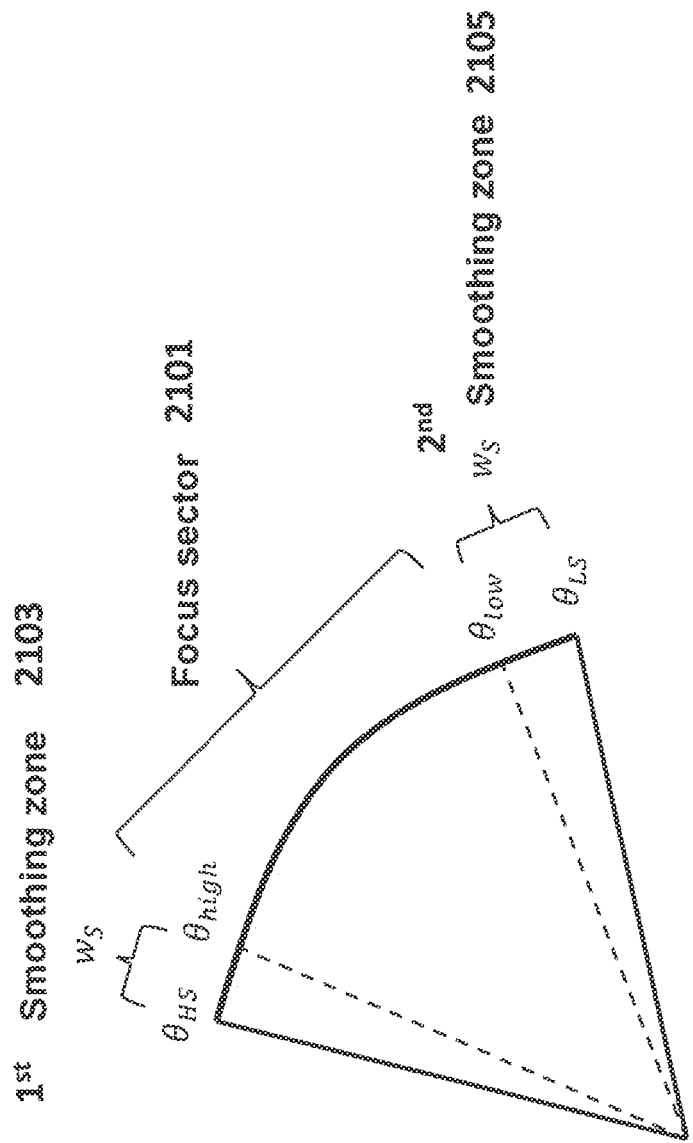
FIG. 22 shows schematically an example of the focus sector and flanking smoothing sectors according to some embodiments.

Example smoothing zones can for example be shown in FIG. 22 as the focus sector 2101 is flanked by a first smoothing zone 2103 and a second smoothing zone 2105. In some embodiments the smoothing zone width can be determined as $w_S = 0.15(|\theta_{high} - \theta_{low}|)$ and the angle terms corresponding to the lower and upper edges of the focus sector ($\theta_{low}$ and $\theta_{high}$), as well as the lower and upper smoothing zone limits ($\theta_{LS} = \theta_{low} - w_S$ and $\theta_{HS} = \theta_{high} + w_S$).

The spatial smoother 1801 is configured to output the sector and smoothing zone information to a spatial smother filter generator 1803.

The operation of generating a smoothing zone about the focus sector is shown in FIG. 21 by step 2001.

In some embodiments the audio processor 103 comprises a spatial smoother filter generator 1803. The spatial smoother filter generator 1803 is configured to receive the spatial smoother output, in other words the smoothing zone information and the audio source directional information and generate a Boolean variable stating whether the spatial source is within the smoothing zone. In some embodiments the Boolean variable z(b), stating whether a direction estimate of band b ($\alpha(b)$) belongs to the smoothing zone or not, is defined as $$z(b) = \begin{cases} 0, & \text{if } \alpha(b) < \theta_{LS}, \\ 1, & \text{if } \theta_{LS} \leq \alpha(b) < \theta_{low}, \\ 0, & \text{if } \theta_{low} \leq \alpha(b) \leq \theta_{high}, \\ 1, & \text{if } \theta_{high} < \alpha(b) \leq \theta_{HS}, \\ 0, & \text{if } \alpha(b) > \theta_{HS}, \end{cases}$$

The operation of determining a Boolean variable z(b) stating whether the audio source is in the smoothing zone is shown in FIG. 21 by step 2003.

The spatial smoother filter generator 1803 can then output the Boolean variable z(b) to the spatial focuser/zoomer/rotator 1805.

The operation of outputting the Boolean variable to the spatial focuser/zoomer/rotator is shown in FIG. 21 by step 2005.

In some embodiments the visual audio processor 103 comprises a spatial focuser/zoomer/rotator 1805. The spatial focuser/zoomer/rotator 1805 is configured to receive the audio source information in terms of mid signal (M), side signal (S) and location (a) of the audio sources from the spatial audio analyser 101. Furthermore the spatial focuser/zoomer/rotator 1805 can receive the audio parameters from the user interface input such as the focus sector information (0, w) and the spatial smoother filter boolean values z(b) from the spatial smoother filter generator 1803. The spatial focuser/zoomer/rotator 1805 is then configured to perform spatial focusing/zooming/rotation on the audio sources.

The operation of performing a spatial focussing/zooming/orientation is shown in FIG. 20 by step 1903.

A (positive) focusing effect or operation attempts to amplify the audio sources within the focus sector and attenuate audio sources outside of the sector. Furthermore in some embodiments the spatial focuser/zoomer/rotator 1805 is configured to generate an angle difference between the estimated audio source location and the focus sector edges when the spatial smoother filter Boolean value z(b) is true. In some embodiments the angle difference $\Delta_{min}$ between $\alpha(b)$ and the focus sector edges can be computed as $$\Delta_{min} = \begin{cases} |\alpha(b) - \theta_{low}|, & \text{if } \theta_{LS} \le \alpha(b) < \theta_{low}, \\ \alpha(b) - \theta_{high}, & \text{if } \theta_{high} < \alpha(b) \le \theta_{HS}, \end{cases}$$

In some embodiments whenever the angle estimation is located inside the focus sector or smoothing zones then the corresponding subband b is amplified to generate the focused effect. In contrast where the location of the audio source is located elsewhere in the spatial environment the subband b is dampened or attenuated. In some embodiments the focusing processing can be performed separately for the mid (M) and side (S) signals and as described herein can vary depending on the desired output mode.

It would be understood that in some embodiments, a negative focusing or filtering on the sector can also be applied. In such embodiments, for example to remove undesired audio sources from a sector, the audio sources within the sector are dampened or attenuated and the audio sources outside of the sector are amplified.

In the examples described herein the positive focusing effect is described generally however it would be understood that a similar negative focusing can also be generated in some embodiments by replacing the gain or amplification term for source within the sector with a dampening or attenuation term and replacing the dampening or attenuation term for sources outside of the sector with a gain or amplification term.

Figure 23:
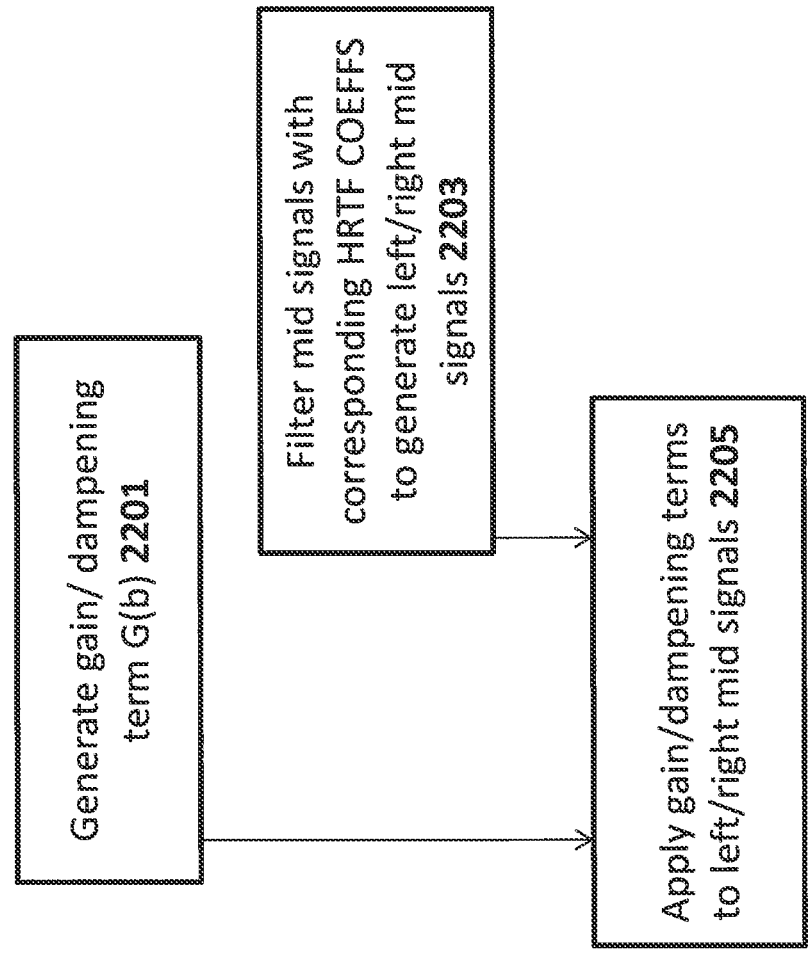
FIG. 23 shows a flow diagram showing the operations of performing spatial audio focussing to generate a binaural audio output based on the mid signal according to some embodiments.

With respect to FIG. 23 an example binaural synthesis focusing operation is described.

In some embodiments the spatial focuser part of the spatial focuser/zoomer/rotator 1805 can be configured to generate a gain term for the audio sources within the focus sector.

In other words in order to perform a proper amplification or dampening to a subband b in a binaural mode, the gain level for a subband b is modified accordingly.

For amplification, the following gain term can in some embodiments be applied:

$G(b)=1+\text{amp}(b),$ where amp(b) is the amplification coefficient corresponding to subband b. The amplification coefficient in some embodiments can be determined by the user, for example by a slider such as shown in the user interface examples described herein (in which case the amplification coefficient can in some embodiments be defined as being equal for all subbands $b \in \{1, B\}$) or in some embodiments the amplication coefficient can be derived subband-wise based on the amount of zooming in the audio field. In some embodiments a suitable value range for amp(b) is between 0.2 and 0.8.

In some embodiments where the direction estimate $\alpha(b)$ is located inside the smoothing zone (z(b)=1), the gain term G(b) is modified by the following expression:

$$G(b) = -[G(b) - (1 - att(b))]\frac{\Delta_{min}}{W_s} + G(b),$$

where att(b) is the attenuation coefficient for subband b. In some embodiments the attenuation constant which defines the amount of dampening can be determined by the user interface input or computed based on the amount of zooming. Suitable values for the attenuation coefficient att(b) range from 0.0 to 1.0. As can be seen, the smoothing zones cause a linear decrease on the gain term G(b) as a function of angle difference $\Delta_{min}$. However it would be understood that in some embodiments any suitable interpolation (linear or non-linear) between the gain term and the attenuation coefficient can be employed.

In some embodiments the spatial focuser part of the spatial focuser/zoomer/rotator 1805 can be configured to perform dampening on audio sources with a location $\alpha(b)$ which lies both outside the focus sector and the smoothing zones. In such embodiments the gain term for such subbands is defined by $G(b)=1-\text{att}(b).$ The operation of generating a gain (dampening in negative focusing) term is shown in FIG. 23 by step 2201.

Furthermore in some embodiments the received mid-signals are filtered using corresponding head related transfer function coefficients to generate left $M_L(b)$ and right $M_R(b)$ mid signals.

The operation of filtering the mid signals with corresponding HRTF coefficients is shown in FIG. 23 by step 2203.

Then in some embodiments the spatial focuser part of the spatial focuser/zoomer/rotator 1805 can be configured to the gain terms are applied to the left and right mid signals to generate left and right focused mid signals $M_L(b)=G(b)M_L(b),$ $M_R(b)=G(b)M_R(b),$ The operation of applying the gain terms to the left and right mid signals is shown in FIG. 23 by step 2205.

Figure 24:
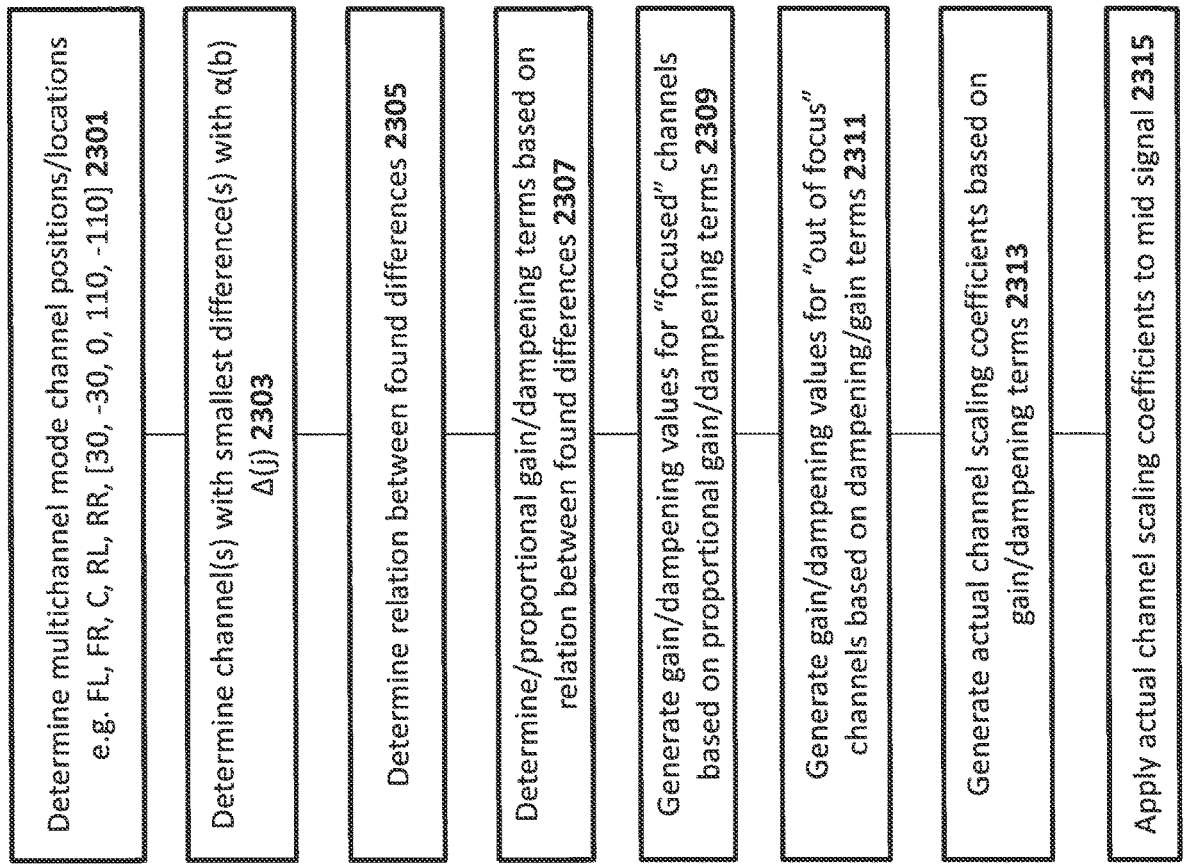
FIG. 24 shows a flow diagram showing the operations of performing spatial audio focussing to generate a multichannel audio output based on the mid signal according to some embodiments.

With respect to FIG. 24 an example multichannel synthesis focusing operation is described.

In some embodiments the spatial focuser part of the spatial focuser/zoomer/rotator 1805 can be configured to determine the multichannel mode channel positions. In the following examples a five channel multichannel configuration is determined the channel order is defined as front left (FL), front right (FR), center (C), rear left (RL) and rear right (RR), corresponding to angles A=[30, −30, 0, 110, −110] (in degrees).

The operation of determining the multichannel mode channel positions/locations is shown in FIG. 24 by step 2301.

The spatial focuser part of the spatial focuser/zoomer/rotator 1805 can then in some embodiments be configured to determine the audio channel with the smallest angle difference to $\alpha(b)$ searched as $$\Delta(j) = |A(j) - \alpha(b)|, \; j \in \{1, 5\}$$
$$c_1 = \underset{j}{\operatorname{argmin}}(\Delta(j)),$$

where $A(j)$ stands for the angle of the jth audio channel, $\Delta(j)$ is the angle difference to channel j, and $c_1$ is the index of the nearest channel to the angle estimation. It would be understood that in most cases the obtained direction estimates are not directly located to any channel position and thus audio panning needs to be considered during the synthesis process. Thus in some embodiments the spatial focuser part of the spatial focuser/zoomer/rotator 1805 can be configured to determine the two audio channels on either side of $\alpha(b)$. In some embodiments this can be determined based on the known channel geometry. In such embodiments the spatial focuser can determine which side of $c_1$ the angle $\alpha(b)$ is located at. The side can then be defined as being positive (+) or negative (−) according to the sign of the angle difference $\Delta(c_1)$ (in other words omitting the absolute value from the difference determination shown above). In the positive case, the channel next in a counter clockwise direction from $c_1$ is considered as the second closest channel, $c_2$ (and vice versa in the negative case the channel next in a clockwise direction from $c_1$ is considered to be the second closest channel $c_2$). The spatial focuser can then also determine the angle difference $\Delta(c_2)$ between $\alpha(b)$ and the second channel $c_2$.

The operation of determining the channels with the smallest difference with the source locations is shown in FIG. 24 by step 2303.

In some embodiments the spatial focuser part of the spatial focuser/zoomer/rotator 1805 can then be configured to determine the relationship R between the determined angle differences and scaled between 0 and $\pi/2$ as $$R = \frac{\Delta(c_1)}{\Delta(c_2)} \pi/2,$$

The operation of determining the relationships between the found differences is shown in FIG. 24 by step 2305.

The spatial focuser part of the spatial focuser/zoomer/rotator 1805 can then in some embodiments be configured to apply the relationship in calculating proportional gain values for the channels. In some embodiments it is assumed that the channel gains obey the relation:

$$G_1^2 + G_2^2 = 1,$$

where $G_1$ and $G_2$ are the proportional gain values for the channels $c_1$ and $c_2$, respectively. In the middle point between the channels (as shown by the location m 2401 in FIG. 25) the gain values are equal; $G_1 = G_2 = 1/\sqrt{2}$. Thus based on this assumption, the gain values for $c_1$ and $c_2$ (of subband b) can be determined as, $$G_2(b) = \sin(R) \frac{1}{\sqrt{2}}$$
$$G_1(b) = \sqrt{1 - G_2(b)^2}.$$

Figure 25:
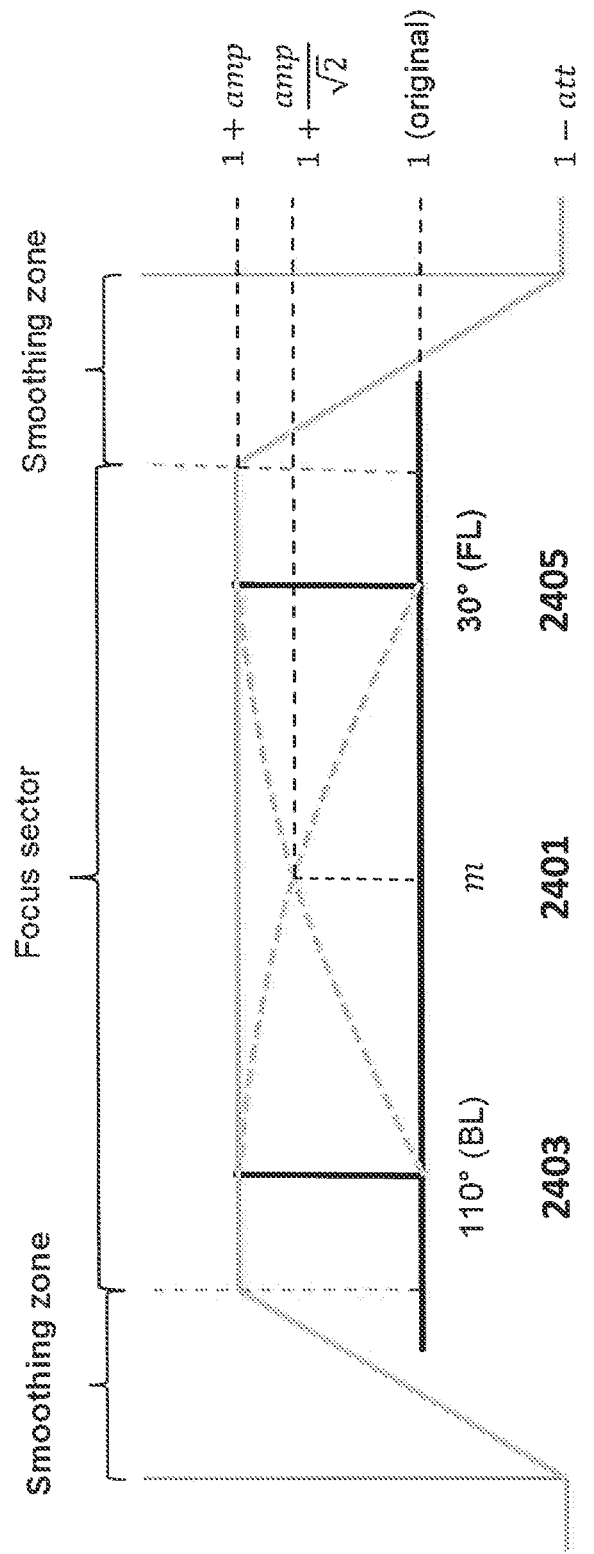
FIG. 25 shows schematically an example of the gain profiles for spatial audio focussing to generate a multichannel audio output based on the mid signal according to some embodiments.

A graphical example of this can for example be shown in FIG. 25 where the two closest channels for a specific example are the BL 2403 and FL 2405 channels and the gains for the focus sector and smoothing zones are shown.

The operation of determining the proportional gain term is based on the relationship between the found differences is shown in FIG. 24 by step 2307.

In some embodiments, for a 5 channel mode example, whenever the focus sector angle $\theta$ is located between −45° and 45°, the amplification gain is divided between all three front speaker channels rather than between the two closest channels. This is implemented because of the small angle distances between the front speakers can cause panning between only two speakers to produce potential artifacts and unnatural audio outputs in certain front focus directions. The threshold angles of ±45° is defined empirically by evaluating the output against few other angle values however other front threshold values can be used. The spatial focuser part of the spatial focuser/zoomer/rotator 1805 can in some embodiments be configured define the second and third channels based on the geometrical division rules provided by the table herein.

| $c_1$ | $c_2$ | $c_3$ |
|---|---|---|
| FL | C | FR |
| FR | C | FL |
| C | $\begin{cases} FR, & \text{if } A(C) - \alpha(b) \geq 0 \\ FL, & \text{else} \end{cases}$ | $\begin{cases} FL, & \text{if } A(C) - \alpha(b) \geq 0 \\ FR, & \text{else} \end{cases}$ |

In these cases, the angle relation between the closest and the third channel is determined. The middle-point channel gains update to $G_1 = G_2 = G_3 = 1/\sqrt{3}$, and the corresponding relations are computed as:

$$R_1 = \frac{\Delta(c_1)}{\Delta(c_2)} \pi/2,$$
$$R_2 = \frac{\Delta(c_1)}{\Delta(c_3)} \pi/2.$$

Accordingly, it is now assumed that the channel gains have the following relation:

$$G_1^2 + G_2^2 + G_3^2 = 1,$$

which means that the proportional gain values for $c_1$, $c_2$ and $c_3$ can be then obtained by:

$$G_3(b) = \sin(R_2) \frac{1}{\sqrt{3}},$$
$$G_2(b) = \sin(R_1) \frac{1}{\sqrt{3}},$$

-continued
$$G_1(b) = \sqrt{1 - G_2(b)^2 - G_3(b)^2}.$$

The spatial focuser part of the spatial focuser/zoomer/rotator 1805 can then in some embodiments be configured to determine final gain values for the focused channels by using the proportional gains. For example the final gains can in some embodiments be determined according to the following expression:

$\hat{G}_X(b)=1+G_X(b)\text{amp}(b), X\in\{1,3\}$

The operation of generating the gain values for the focused channels based on the proportional gain term is shown in FIG. 24 by step 2309.

The spatial focuser/zoomer/rotator 1805 can then in some embodiments be configured to determine for the remaining two channels (or three when only two channels are applied in the panning) gain values which dampen the channels in order to emphasize the focus effect. Where the estimated angle $\alpha(b)$ for a sub-band belongs to the smoothing zone, the gain values are updated as, $$\hat{G}_X(b) = -\left[\hat{G}_X(b) - (1 - att(b))\right]\frac{\Delta_{min}}{w_s} + \hat{G}_X(b).$$

It can be seen that the example scaling logic is similar to that shown with respect to the binaural mode.

The operation of generating the damping values for out of focus channels based on the damping terms is shown in FIG. 24 by step 2311.

In FIG. 25 an example amplification is shown with two channels, where a side view of the zooming sector and smoothing zones with their corresponding gain values are shown.

In some embodiments the spatial focuser can be configured such that whenever $\alpha(b)$ is not inside the focus sector or smoothing zones, dampening is performed to all channels except for the channel closest to the focus angle $\theta$. In some embodiments this can be implemented by setting the gain values to $\hat{G}_X(b)=1-\text{att}(b), X\in\{1,\ldots,5\}/\backslash X\neq i,$ where $i$ is the index of the channel nearest to $\theta$. The remaining channel is left untouched, i.e. $\hat{G}_i(b)=1$. This is done to avoid dampening potential non-dominant sound sources and original background noise arriving from the focused direction, as also those should be heard as focused at the synthesized output.

The spatial focuser/zoomer/rotator 1805 can then in some embodiments be configured to determine the actual channel scaling coefficients $\hat{g}_X(b)$ based on the computed gain values $\hat{G}_X(b)$ Amplification:

$\hat{g}_1(b)=\hat{g}_1(b)\hat{G}_1(b), \hat{g}_2(b)=\hat{g}_2(b)\hat{G}_2(b), \hat{g}_3(b)=\hat{g}_3(b)\hat{G}_3(b).$ $\hat{g}_X(b)=\hat{g}_X(b)(1-\text{att}(b)),$ Dampening:

$\hat{g}_X(b)=\hat{g}_X(b)\hat{G}_X(b),$ where $\hat{g}_1(b)$, $\hat{g}_2(b)$ and $\hat{g}_3(b)$ stand for the scaling coefficients of the channels $c_1$, $c_2$ and $c_3$, respectively.

The operation of generating the actual channel scaling coefficients based on the gain term is determined is shown in FIG. 24 by step 2313.

Furthermore the spatial focuser/zoomer/rotator 1805 can then in some embodiments be configured to determine the directional and focused components are obtained using the mid signal M(b) as $C_M(b)=\hat{g}_C(b)M(b),$ $FL_M(b)=\hat{g}_{FL}(b)M(b),$ $FR_M(b)=\hat{g}_{FR}(b)M(b),$ $RL_M(b)=\hat{g}_{RL}(b)M(b),$ $RR_M(b)=\hat{g}_{RR}(b)M(b).$ The application of the actual channel scaling coefficients to the mid signal is shown in FIG. 24 by step 2315.

It would be understood that in some embodiments due to some ambiguities and disturbances in many recorded audio signals, reliable direction estimates cannot be obtained for all the (B=32) subbands. For example usually the number of valid direction estimates for the B=32 subband determination can vary between 18 and 22 per frame. In such embodiments both in the binaural and the multi-channel modes, the described focus procedure can be performed to only those subbands with valid direction estimates to prevent emphasizing potentially incorrect directions. In some embodiments to overcome such a limitation, an additional gain control procedure as described herein is applied which allows modifying every subband by means of statistical analysis.

In some embodiments the spatial focuser/zoomer/rotator 1805 can be further configured to process the side signal S(b). It would be understood that since there is no directional information included in the side signal s(b), in the binaural mode the audio focuser has no effect to the side signal synthesis.

In other words the side signal is added un-modified to the processed mid signal.

However, in multi-channel synthesis, the focusing effect can also be applied to the side signal by considering the focus angle $\theta$ as the obtained angle estimation $\alpha$ for all subbands. The ambient signal is hence amplified in the focused direction to enhance the overall focus effect. It would be understood however that the amplification of side signal components should be performed with caution to retain a natural tone in the synthesized output signal. For example a too high amplification of the side signal focus tends to "draw" the whole audio scene towards the specified angle, which should be avoided.

For example in some embodiments the spatial focuser/zoomer/rotator 1805, once the proportional gain values $G_X$ are obtained for the multi-channel synthesis, the actual side signal scaling factors $\gamma_X$ for each channel can be derived as $\gamma_1=\hat{\gamma}[1]+G_1\text{amp}_S, \gamma_2=\hat{\gamma}[2]+G_2\text{amp}_S, \gamma_3=\hat{\gamma}[3]+G_3\text{amp}_S,$ $\gamma_X=\hat{\gamma}[X](1-\text{att}_S).$ where $\hat{\gamma}=[0.25, 0.25, 0.25, 0.38, 0.38]$ is a vector containing fixed, "unbalanced", gamma values for each channel, and $\text{amp}_s$ and $\text{att}_s$ are the amplification and attenuation factors for the side signal, respectively. In some embodiments suitable values for these vary between 0.1 and 0.3.

In some embodiments the output of the spatial focuser can be passed to the post processing gain control/temporal smoother 1807.

The operation of performing a focusing operation is shown in FIG. 20 by step 1903.

In some embodiments the audio processor 103 further comprises a post processing gain control/temporal smoother 1807.

Figure 26:
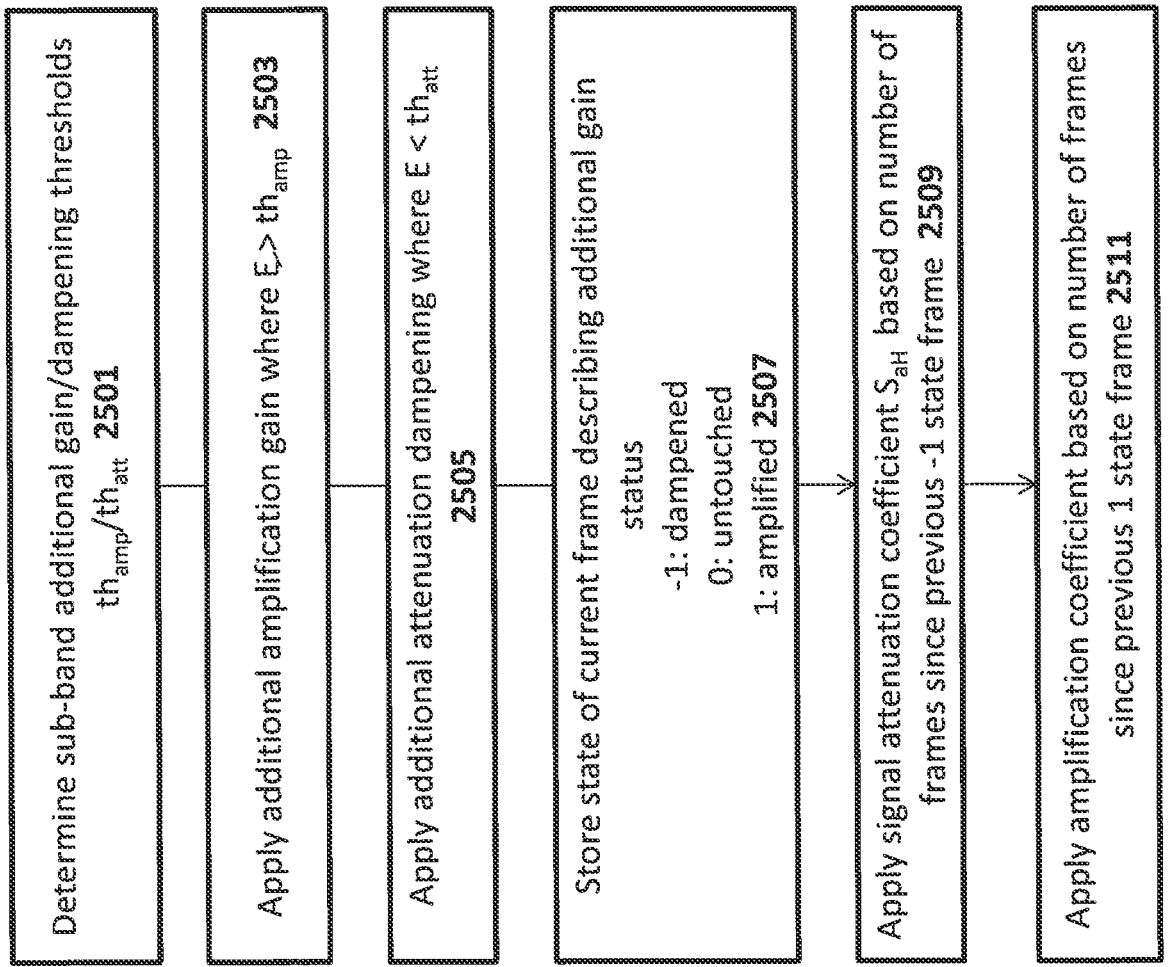
FIG. 26 shows a flow diagram showing the operations of additional gain control and temporal smoothing according to some embodiments.

With respect to FIG. 26 a flow chart of the operations of an example post processing gain controller/temporal smoother 1807 are shown.

In some embodiments (for both the multi-channel and binaural syntheses) the processed mid signals can be further processed to further enhance the focus effect.

In other words in some embodiments whenever a determined amount of direction estimates are obtained inside the focus sector within a single time frame, all the subbands are further modified by additional gain coefficients.

Furthermore in some embodiments the post processing gain control/temporal smoother 1807 can be configured to apply temporal smoothing to avoid sudden gain changes over consecutive frames.

In some embodiments the post processing gain controller/temporal smoother 1807 can be configured to determine the sub-band thresholds that are used to determine whether additional gain control is to be applied. In some embodiments the sub-band thresholds are based on experimental testing and the applied number of sub-bands. For example in a B=32 case the thresholds for additional gain amplification and attenuation can be determined as $th_{amp}=8$ and $th_{att}=4$, respectively. These thresholds correspond to the minimum and maximum number of direction estimates allowed inside the focused sector in a single frame for triggering the additional gain control process. It would be understood that in some embodiments the example applied number of sub-bands (B=32) represents only one possibility among many others and as such any suitable number of sub-bands may be also applied (which can then cause the thresholds to change accordingly).

In some embodiments the post processing gain controller/temporal smoother 1807 can be configured to determine the number of direction estimates inside the focused sector, E and further compare the value of E to the set thresholds. In other words by evaluating the number of valid in-sector direction estimates in some situations the post processing gain controller/temporal smoother 1807 can be configured to amplify or dampen all the 32 subbands within the current time frame, including also those bands with unreliable/unknown $\alpha(b)$ estimates obtained in the spatial audio analyser.

In some embodiments the additional amplification is applied only to those audio source bands within the focus sector or where the direction is unreliable/unknown when the threshold is met. Similarly in some embodiments the bands with estimates inside the sector are not affected by additional dampening (based on the set thresholds, there are at most 3 such bands in that case).

For example in binaural synthesis modes, the following equations can be applied for additional amplification in some embodiments where $E \geq th_{amp}$ $$M_L(b)=M_L(b)(1+amp_{add}),$$

$$M_R(b)=M_R(b)(1+amp_{add}),$$

and additional attenuation where $E<th_{att}$:

$$M_L(b)=M_L(b)(1-att_{add}),$$

$$M_R(b)=M_R(b)(1-att_{add}),$$

The terms $amp_{add}$ and $att_{add}$ are additional amplification and attenuation coefficients derived from the original amp and att coefficients. The additional gain coefficients in some embodiments are static and fixed among the sub-bands (in other words they are not affected by the amount of zooming).

In the multi-channel synthesis modes, the following equations are applied for the channel scaling coefficients:

$$\text{Amplification: } \hat{g}_X(b)=\hat{g}_X(b)(1+amp_{add}),$$

$$\text{Dampening: } \hat{g}_X(b)=\hat{g}_X(b)(1-att_{add}),$$

which are then applied to $$\hat{g}_1(b)=\hat{g}_1(b)\hat{G}_1(b), \hat{g}_2(b)=\hat{g}_2(b)\hat{G}_2(b), \hat{g}_3(b)=\hat{g}_3(b)\hat{G}_3(b).$$

$$\hat{g}_X(b)=\hat{g}_X(b)(1-att(b)),$$

$$\hat{g}_X(b)=\hat{g}_X(b)\hat{G}_X(b),$$

where $\hat{g}_1(b)$, $\hat{g}_2(b)$ and $\hat{g}_3(b)$ stand for the scaling coefficients of the channels $c_1$, $c_2$ and $c_3$, respectively. The directional and focused components are obtained using the mid signal M(b) as $$C_M(b)=\hat{g}_C(b)M(b),$$

$$FL_M(b)=\hat{g}_{FL}(b)M(b),$$

$$FR_M(b)=\hat{g}_{FR}(b)M(b),$$

$$RL_M(b)=\hat{g}_{RL}(b)M(b),$$

$$RR_M(b)=\hat{g}_{RR}(b)M(b).$$

to obtain the actual audio channel signals.

The operation of applying an additional gain or amplification to the sub-bands where $E \geq th_{amp}$ is shown in FIG. 26 by step 2503.

The operation of applying an additional attenuation or dampening to the sub-bands where $E<th_{att}$ is shown in FIG. 26 by step 2505.

In some embodiments the post processing gain controller/temporal smoother 1807 can be configured to save the 'state' of the current frame describing the additional gain status. An example of a state definition can be one of three values: "−1" (dampened), "0" (untouched), and "1" (amplified).

The operation of storing a 'state' indicator of the current frame is shown in FIG. 26 by step 2507.

In some embodiments the post processing gain controller/temporal smoother 1807 can further apply temporal smoothing to the audio signals based on the past history of frame states.

For example in some embodiments in dampening, the overall signal level of the frame can be decreased by multiplying all the synthesized output audio channels with a specific signal attenuation coefficient, $s_{att}$, which in some embodiments can be experimentally fixed to:

$$s_{att}=1-(0.175/f_{att})\text{(multi-channel synthesis)}$$

$$s_{att}=1-(0.2/f_{att})\text{(binaural synthesis)}.$$

The $f_{att}$ parameter in the above expression is the number of frames since the previous "−1" state frame. In such embodiments the post processing gain controller/temporal smoother 1807 can enable a smooth transition from the dampened signal level to the original level over several frames. In some embodiments an upper limit for the number of such "transition frames" can be set to $f_{att}=15$ for dampening.

The operation of applying signal attenuation coefficients based on the number of frames since the previous dampened state is shown in FIG. 26 by step 2509.

For example in some embodiments a similar amplification attenuation can be applied for smoothing from previous amplified states. For example a value of $f_{amp}=5$ for amplification can be defined and a transition to the additional amplification coefficient, $amp_{add}$, defined so that for binaural synthesis the following is used $$M_L(b) = M_L(b)\left(1 + \frac{amp_{add}}{f_{amp}}\right),$$

$$M_R(b) = M_R(b)\left(1 + \frac{amp_{add}}{f_{amp}}\right),$$

or in the case of multi-channel synthesis, $$\hat{g}_X(b) = \hat{g}_X(b)\left(1 + \frac{amp_{add}}{f_{amp}}\right),$$

The operation of applying signal attenuation coefficients based on the number of frames since the previous amplified state is shown in FIG. 26 by step 2511.

In such embodiments whenever a new frame of state "1" or state "−1" occurs, the corresponding counters are set to 1. In some embodiments the remaining "0" state (occurring when $th_{att} \leq E < th_{amp}$) causes no additional actions to the signal level.

Figure 27:
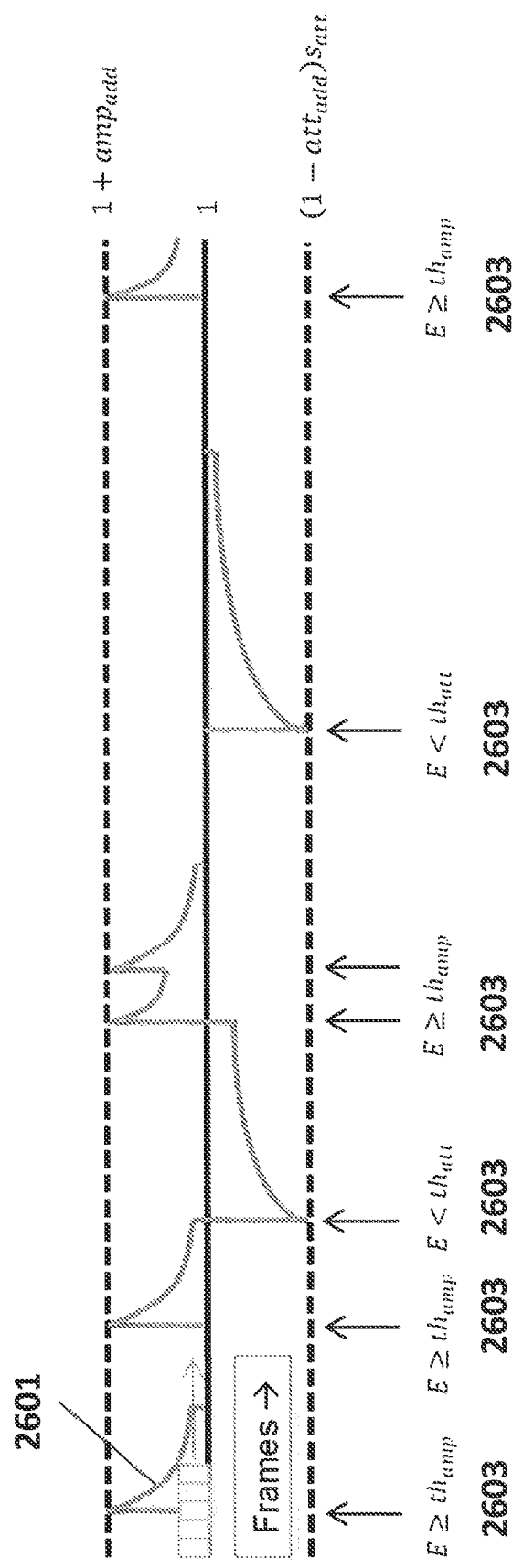
FIG. 27 shows schematically an example showing temporal smoothing according to some embodiments.

The temporal smoothing procedure is shown with respect to FIG. 27, where the solid curve 2601 roughly demonstrates the variation of the additional gain coefficients during the signal, and the black arrows 2603 indicate the "1" and "−1" state occurrences.

The post processing gain control/temporal smoother 1807 can in some embodiments be configured to output the processed signals to a channel mode converter.

In some embodiments the audio processor 103 further comprises a channel mode converter 1809. The channel mode converter can in some embodiments be configured to receive the processed mid and side signals and generate suitable channel outputs.

For example in some embodiments the channel mode converter is configured to generate a stereo signal suitable for headphone listening from a multichannel processed signal.

With respect to FIG. 28A a first implementation of the multichannel to stereo output operation is shown. In some embodiments the mode converter 1809 is configured to perform a conversion directly from the multi-channel synthesis output by using the following conversion formulas:

$L(z) = FL(z) + 0.71C(z) + 0.71RL(z),$ $R(z) = FR(z) + 0.71C(z) + 0.71RR(z),$ where X(z) corresponds to the time-domain signal of channel X.

The operation of applying a direct time domain conversion from a multichannel synthesis is shown in FIG. 28A by step 2701.

With respect to FIG. 28B a second implementation of the multichannel to stereo output operation is shown. In some embodiments the mode converter 1809 is configured to use the focused mid-signals M(b) of the multi-channel synthesis and consider the original (non-focused) side-signals. In these embodiments the stereo signal conversion is performed in the frequency domain, once the focusing effect is combined with the mid-signal components. The stereo conversion is performed as shown above with respect to FIG. 28A however the operations are performed to frequency domain coefficients such as $C_M(b)=\hat{g}_C(b)M(b)$, separately for each frequency bin n at each subband b and the side signal S(b) is added to the right channel and removed from the left one. The transformation to the time domain can in some embodiments be performed using an inverse Fourier transform (IFT). In such embodiments a "smoother" and more stable background noise compared to the first "direct" conversion option is generated.

The operation of applying a frequency domain conversion from a multichannel synthesis is shown in FIG. 28B by step 2703.

With respect to FIG. 28C a third implementation of the multichannel to stereo output operation is shown. In some embodiments the mode converter 1809 is configured to perform audio panning on the angle estimations α(b). The panning coefficients of the two channels ($P_R$, $P_L$) are computed as $$P_R = \sqrt{\frac{\sin\left(-\frac{\alpha(b)}{360}2\pi\right) + 1}{2}},$$

$$P_L = \sqrt{1 - P_R^2},$$

where α(b) angle sign is changed. In situations where the angle estimation of band b is uncertain, the coefficients are given the default value of $P_R = P_L = 1/\sqrt{2}$.

The operation of panning is shown in FIG. 28C by step 2705.

In some embodiments a mono output can be formed from the stereo signal as $C(z) = R(z)/2 + L(z)/2.$ This can be defined as being a focused mono signal, where the amplified and dampened directions and sound sources are still audible, although no directional information is passed to the user.

The operation of performing a post processing is shown in FIG. 20 by step 1905.

In some embodiments in addition to focusing, the spatial focuser/zoomer/rotator 1805 can be further configured to perform virtual moving (zooming) and turning (rotating) in the audio scene.

For example in some embodiments the spatial focuser/zoomer/rotator 1805 can be further configured to perform zooming by updating the estimated sound direction angles from the spatial audio analyser 101 according to the relative "movement" of the apparatus in the audio scene. As described herein a reference source "distance" of r=2 can be used for the sound sources, although any other suitable distance can be applied.

Figure 30:
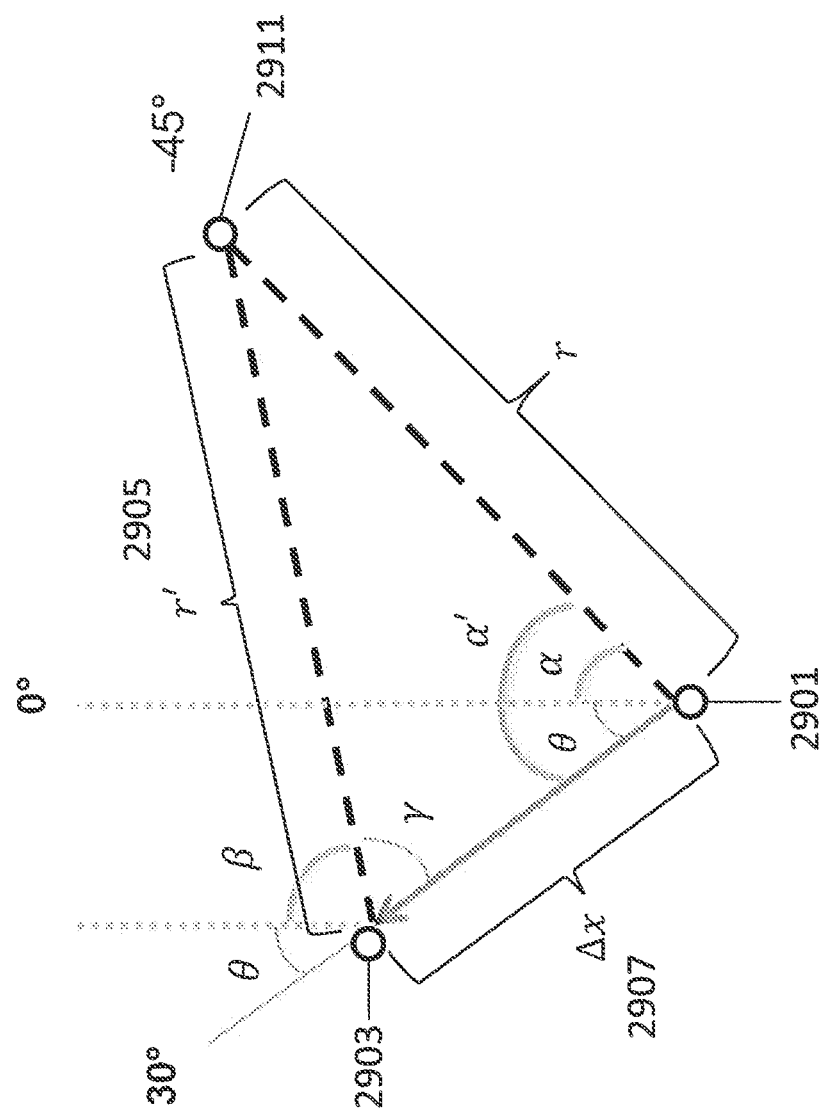
FIG. 30 shows schematically an example of spatial audio zooming according to some embodiments.

An example zooming is shown with respect to FIG. 30 where the apparatus 'moves' or zooms at an angle θ=30° by a distance Δx, from a first position 2901 to a second position 2903 so that an originally estimated sound source 2911 at angle α=−45° updates to β<−45°. In some embodiments the spatial focuser/zoomer/rotator 1805 can be further configured to perform the following operations for all subbands with a valid direction estimate.

Figure 29:
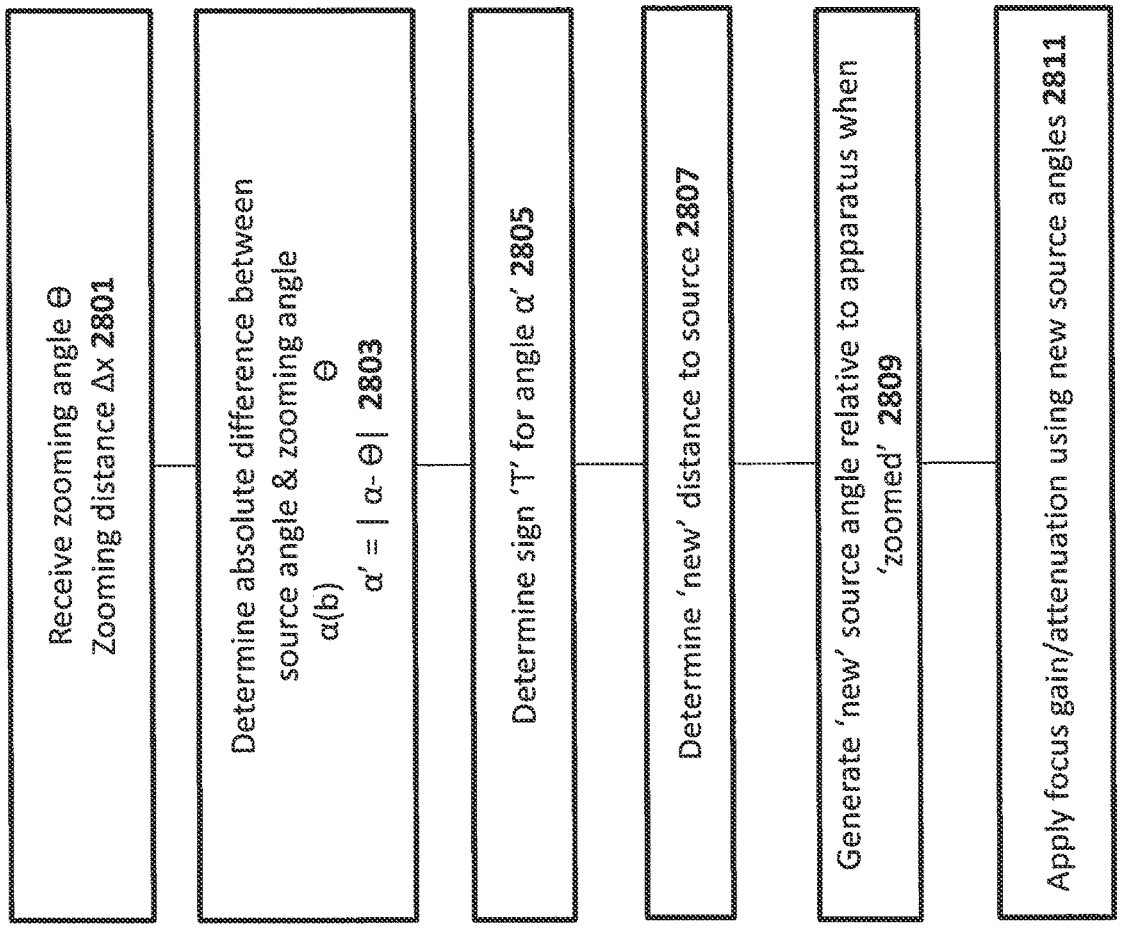
FIG. 29 shows a flow diagram showing the operations of performing spatial audio zooming according to some embodiments.

With respect to FIG. 29 a flow chart of the operation of zooming is shown according to some embodiments.

In some embodiments the spatial focuser/zoomer/rotator 1805 can be configured to receive the zooming angle θ and zooming distance Δx. It can be seen that in the following examples the zooming angle is the same as the focus angle. However it would be understood that in some embodiments the zooming angle and the focus angle are different. The zooming angle and zooming distance can for example be received from the user interface or be determined by the orientation of the apparatus relative to the audio scene.

The operation of receiving the zooming angle and zooming distance is shown in FIG. 29 by step 2801.

In some embodiments the spatial focuser/zoomer/rotator 1805 can be configured to compute the absolute difference between the angle estimation and zooming direction as $$\alpha' = |\alpha - \theta|,$$

after which the angle difference can be converted to radians: $\alpha' = (\alpha'/360)2\pi$.

The operation of generating the absolute difference is shown in FIG. 29 by step 2803.

In some embodiments the spatial focuser/zoomer/rotator 1805 can then be configured to determine a sign T. The zooming direction θ can in some embodiments be considered as a "threshold" for determining a sign T for angle α'. In some embodiments the sign T can be generated according to the following logic rules.

|  | α ≥ 0 | α < 0 |
|---|---|---|
| θ ≥ 0 | θ − α > 0 ⇒ T = −1 | θ − α < 180 ⇒ T = −1 |
|  | θ − α < 0 ⇒ T = 1 | θ − α ≥ 180 ⇒ T = 1 |
| θ < 0 | θ − α < −180 ⇒ T = −1 | θ − α > 0 ⇒ T = −1 |
|  | θ − α ≥ −180 ⇒ T = 1 | θ − α < 0 ⇒ T = 1 |

The operation of generating the sign T is shown in FIG. 29 by step 2805.

In some embodiments the spatial focuser/zoomer/rotator 1805 can then be further configured to generate the new distance, r', 2905 to the sound source. This can for example be determined by using the cosine law $$r' = \sqrt{\Delta x^2 + r^2 - 2\Delta x r \cos(\alpha')},$$

where Δx 2907 is the amount of zooming or the distance of motion for the zooming as received previously and in this example (Δx ∈ {0.0, 2.0}).

The operation of generating the new distance r' to the source is shown in FIG. 29 by step 2807.

In some embodiments the spatial focuser/zoomer/rotator 1805 can then be further configured to generate the new angle β as $$\beta = \cos^{-1}\left[\frac{r^2 - \Delta x^2 - r'^2}{-2\Delta x r'}\right].$$

The obtained angle β is converted back to degrees as $\beta = (\beta/2\pi)360$.

Furthermore the sign T is then applied:

$$\beta = \begin{cases} 180 - \beta + \theta, & \text{if } T = 1 \\ -(180 - \beta - \theta), & \text{if } T = -1 \end{cases}.$$

The angle limitation between −180° and 180° is also performed as $$\beta = \begin{cases} -180 + (\beta - 180), & \text{if } \beta > 180 \\ 180 + (\beta + 180), & \text{if } \beta < -180 \end{cases}.$$

The operation of generating the new source angle relative to the apparatus when zoomed is shown in FIG. 29 by step 2809.

Thus in some embodiments the spatial focuser/zoomer/rotator 1805 can then be further configured to apply the focusing operations described herein using the new angle β and the new relative distances to generate new gain values amp(b) and att(b). For example $$amp(b) = \begin{cases} amp(b), & r'(b) \geq 2 \\ amp_{max} - \dfrac{r'(b)}{r} amp_{max}, & r'(b) < 2 \end{cases}$$

$$att(b) = \begin{cases} att(b), & r'(b) \leq 2 \\ \dfrac{r'(b)}{r} - 1, & r'(b) > 2 \end{cases}.$$

The term $amp_{max}$ is a fixed maximum amplification allowed for zooming, for example $amp_{max} = 1.2$. As with the focus approach, a sector width, w, is defined also with zooming. Thus, depending on the zooming direction, it may also happen that the new distance r' decreases to a sound source outside the sector or, instead, increases to an in-sector source. This is why the dampening and amplification is defined for all possible distance cases.

The operation of then using the new relative distance and angles in focusing operations is shown in FIG. 29 by step 2811.

With respect to FIG. 32 an example 'virtual' rotating or rotation of the apparatus is shown where the apparatus 3101 is originally orientated at 0° and performs a rotation of angle θ 3103 in a clockwise direction.

Figure 31:
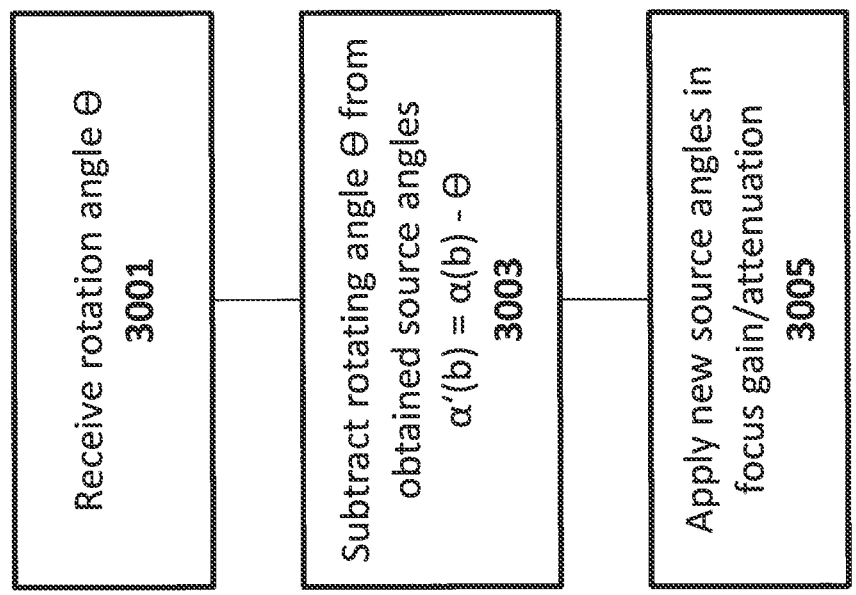
FIG. 31 shows a flow diagram showing the operations of performing spatial audio rotating according to some embodiments.

With respect to FIG. 31 a flow chart of the operation of rotating is shown according to some embodiments.

In some embodiments the spatial focuser/zoomer/rotator 1805 can be configured to receive the rotation angle θ. It can be seen that in the following examples the rotation angle is the same as the focus angle. However it would be understood that in some embodiments the rotation angle and the focus angle are different. The rotation angle can for example be received from the user interface or be determined by the orientation of the apparatus relative to the audio scene.

The operation of receiving the rotation angle is shown in FIG. 31 by step 3001. In some embodiments the spatial focuser/zoomer/rotator 1805 can be configured to generate the virtual turning by subtracting the rotation or turning angle θ from the obtained direction estimates. For example the original direction estimation α 3105 is updated to α' 3107 according to $$\alpha'(b) = \alpha(b) - \theta,$$

while the updated α'(b) is still kept between −180° and 180°.

The operation of generating the new direction estimates is shown in FIG. 31 as step 3003.

Thus in some embodiments the spatial focuser/zoomer/rotator 1805 can then be further configured to apply the focusing operations described herein using the new angle α' in place of the previous source estimate α.

The operation of then using the new relative angles in focusing operations is shown in FIG. 31 by step 3005.

It would be understood that the turning and zooming operations can also be performed simultaneously, in which case a similar angle subtraction is performed to the obtained new zoomed sound source angles β'(b) to replace β(b).

The audio processor 103 can therefore in some embodiments generate a processed audio signal which can be passed to the spatial audio output 105.

The operation of audio signal processing based on at least the UI input is shown in FIG. 3 by step 207.

In some embodiments the spatial audio output 105 is configured to output the processed audio signals to a suitable playback apparatus or to memory or any suitable storage element. The output or playback audio can in some embodiments be at least one of; a mono, a stereo, a binaural, multi-channel, spatial or 3D audio signal.

Furthermore it would be understood that the processing of the audio signals (or the outcome of such sound manipulation based on the user input) can be output to a suitable playback apparatus where such playback audio can be used to generate a mono or multi-channel audio playback to the user. In some embodiments the suitable playback apparatus can be coupled to the apparatus via an audio connector or in some embodiments be at least one internal speaker of the apparatus.

Furthermore the processed audio signal (the sound manipulation) and/or adjusted settings based on the user input can be saved or stored (for example in an internal memory, database or cloud) either alone or with the visual data.

The operation of providing an output for the processed audio signals is shown in FIG. 3 by step 209.

In the description herein the components can be considered to be implementable in some embodiments at least partially as code or routines operating within at least one processor and stored in at least one memory.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer code for one or more programs, the at least one memory and the computer code configured to with the at least one processor cause the apparatus to:

determine at least one visual image element;

receive at least two audio signals from at least two microphones, wherein each microphone of the at least two microphones is separated from each other;

determine, using the at least two audio signals, a location of at least one audio source relative to the at least two microphones, wherein the at least one audio source is determined at least in part as environmental sound;

associate the at least one visual image element with the location of the at least one audio source relative to the at least two microphones;

provide at least one control input associated with the at least one visual element, the at least one control input comprising at least one control for at least one focus region direction and width;

process the at least one audio source to change at least one audio characteristic of the at least one audio source according to the determined location of the at least one audio source based on the provided and width of the at least one focus region; and amplify or attenuate the at least one audio source for playback dependent on the location of the at least one audio source based on the at least one control for the at least one focus region direction and width.

2. The apparatus as claimed in claim 1, further caused to:
generate the at least one visual image element comprising at least one user interface overlay element and at least one captured image frame; and
display the at least one visual image element on a touch interface display configured to provide the at least one control input.

3. The apparatus as claimed in claim 2, wherein providing the at least one control input causes the apparatus to determine at least one user interface parameter associated with the at least one control input.

4. The apparatus as claimed in claim 3, wherein generating the at least one visual image element causes the apparatus to generate the at least one user interface overlay element based on the at least one user interface parameter.

5. The apparatus as claimed in claim 2, wherein the at least one user interface overlay comprises at least one of:
an overlay displaying the at least one audio source signal with the location; a focus region overlay displaying a processing focus range and direction;
a zoom location overlay displaying a processing zoom or motion location;
a rotation overlay displaying a processing rotation;
a toggle activate spatial processing overlay configured to display a toggle state for generating at least one further at least one user interface overlay element;
a focus amplification overlay configured to display at least one amplification gain for audio sources inside the at least one focus region;
a focus attenuation overlay configured to display at least one attenuation dampening for audio sources outside of the at least one focus region;
a focus inverter overlay configured to display a toggle state for inverting the focus operation; or
a focus amplification profile overlay configured to display an amplification profile for directions surrounding the apparatus.

6. The apparatus as claimed in claim 1, wherein the provided at least one control input associated with the at least one visual image element causes the apparatus to provide at least one of:
at least one control input generated by a motion of the apparatus displaying the at least one visual image element; and
at least one control input generated by an operation of camera inputs associated with the at least one visual image element.

7. The apparatus as claimed in claim 1, wherein the at least one audio source to change at least one audio characteristic of the at least one audio source based on the at least one control input causes the apparatus to:
generate at least one processing parameter associated with the at least one control input; and
process the at least one audio source based on the at least one processing parameter.

8. The apparatus as claimed in claim 7, wherein the generated at least one processing parameter associated with the at least one control input causes the apparatus to generate at least one of:

at least one focus region range;
at least one focus region direction;
at least one smoothing region direction;
at least one smoothing region range;
at least one focus region amplification gain;
at least one focus region out of region attenuation factor;
at least one focus region attenuation factor;
at least one focus region out of region amplification gain;
at least one virtual motion or zoom direction;
at least one virtual motion or zoom displacement; or
at least one virtual motion or rotation angle of rotation.

9. The apparatus as claimed in claim 8, wherein the generated at least one processing parameter causes the apparatus to at least one of:
determine a zoom location based on the at least one virtual motion or zoom direction and at least one virtual motion or zoom displacement;
determine for the at least one audio source a new distance between the zoom location and the at least one audio source location;
determine for the at least one audio source a new direction between the zoom location and the at least one audio source location; or
replace the at least one audio source location with a new audio source location based on the new distance and new direction values.

10. The apparatus as claimed in claim 8, wherein the generated at least one processing parameter causes the apparatus to:
determine a rotation orientation based on the at least one virtual motion or rotation angle;
determine for the at least one audio source a new direction between the rotation orientation and the at least one audio source location; and
replace the at least one audio source location with a new audio source location based on the new direction value.

11. The apparatus as claimed in claim 8, wherein the generated at least one processing parameter causes the apparatus to at least one of:
amplify the at least one audio source by the at least one focus region amplification gain where the at least one audio source location is within the at least one focus region direction and range;
attenuate the at least one audio source by the at least one focus region out of region attenuation factor where the at least one audio source location is outside the at least one focus region direction and range and outside the at least one smoothing region direction and range; and
apply an interpolation of the at least one focus region amplification gain and the at least one focus region out of region attenuation factor where the at least one audio source location is within the at least one smoothing region direction and range.

12. The apparatus as claimed in claim 8, wherein the generated at least one processing parameter causes the apparatus to at least one of:
attenuate the at least one audio source by the at least one focus region attenuation factor where the at least one audio source location is within the at least one focus region direction and range;
amplify the at least one audio source by the at least one focus region out of region amplification gain where the at least one audio source location is outside the at least one focus region direction and range and outside the at least one smoothing region direction and range; and
apply an interpolation of the at least one focus region attenuation factor and the at least one focus region out of region amplification gain where the at least one audio source location is within the at least one smoothing region direction and range.

13. The apparatus as claimed in claim 8, wherein the generated at least one processing parameter causes the apparatus to apply a time smoothing factor to at least one of: the at least one focus region amplification gain; at least one focus region out of region attenuation factor; at least one focus region attenuation factor; or at least one focus region out of region amplification gain.

14. The apparatus as claimed in claim 1, further caused to receive the at least two audio signals from at least one of:
the at least two microphones;
an apparatus memory; or
at least one further apparatus.

15. The apparatus as claimed in claim 1, further caused to: receive at least one captured image frame from which the at least one visual image element is determined, wherein the at least one captured image frame is received from at least one of: at least one camera; a memory; and at least one further apparatus.

16. A method comprising:
determining at least one visual image element;
receiving at least two audio signals from at least two microphones, wherein each microphone of the at least two microphones is separated from each other;
determining, using the at least two audio signals, a location of at least one audio source relative the at least two microphones, wherein the at least one audio source is determined at least in part as environmental sound;
associating the at least one visual image element with the location of the at least one audio source relative to the at least two microphones;
providing at least one control input associated with the at least one visual element, the at least one control input comprising at least one control for at least one focus region direction and width;
processing the at least one audio source to change at least one audio characteristic of the at least one audio source according to the determined location of the at least one audio source based on the provided direction and width of the at least one focus region during playback; and
amplifying or attenuating the at least one audio source for playback dependent on the location of the at least one audio source based on the at least one control for the at least one focus region direction and width.

17. The method as claimed in claim 16, further comprising:
generating the at least one visual image element comprising at least one user interface overlay element and at least one captured image frame; and
displaying the at least one visual image element on a touch interface display configured to provide the at least one control input.

18. The method as claimed in claim 17, wherein the at least one user interface overlay comprises at least one of:
an overlay displaying the at least one audio source signal with a location;
a focus region overlay displaying a processing focus range and direction;
a zoom location overlay displaying a processing zoom or motion location;
a rotation overlay displaying a processing rotation;
a toggle activate spatial processing overlay configured to display the toggle state for generating at least one further at least one user interface overlay element;
a focus amplification overlay configured to display at least one amplification gain for audio sources inside a focus region;
a focus attenuation overlay configured to display at least one attenuation dampening for audio sources outside of a focus region;
a focus inverter overlay configured to display a toggle state for inverting the focus operation; or
a focus amplification profile overlay configured to display an amplification profile for directions surrounding the apparatus.

19. The method as claimed in claim 16, wherein providing at least one control input associated with the at least one visual image element causes the apparatus to provide at least one of:
at least one control input generated by a motion of the apparatus displaying the at least one visual image element; or
at least one control input generated by an operation of camera inputs associated with the at least one visual image element.

20. An apparatus comprising:
an image element determiner configured to determine at least one visual image element;
a spatial audio analyzer configured to receive at least two audio signals from at least two microphones, wherein each microphone of the at least two microphones is separated from each other;
the spatial audio analyzer configured to determine, using the at least two audio signals, a location of at least one audio source relative to the at least two microphones, wherein the at least one audio source is determined at least in part as environmental sound;
the spatial audio analyzer further configured to associate the at least one visual image element with the location of the at least one audio source relative to the at least two microphones;
a user interface controller configured to provide at least one control input associated with the at least one visual element, the at least one control input comprising at least one control for at least one focus region direction and width;
an audio processor configured to process the at least one audio source to change at least one audio characteristic of the at least one audio source according to the determined location of the at least one audio source based on the provided direction and width of the at least one focus region; and
the audio processor further configured to amplify or attenuate the at least one audio source for playback dependent on the location of the at least one audio source based on the at least one control for the at least one focus region direction and width.

* * * * *